(12) United States Patent
Takao et al.

(10) Patent No.: US 9,927,223 B2
(45) Date of Patent: Mar. 27, 2018

(54) DISTANCE IMAGE ACQUISITION APPARATUS AND DISTANCE IMAGE ACQUISITION METHOD

(71) Applicant: FUJIFILM Corporation, Tokyo (JP)

(72) Inventors: Hiroaki Takao, Saitama (JP); Takeshi Misawa, Saitama (JP); Takeshi Kamiya, Saitama (JP); Tomonori Masuda, Saitama (JP); Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/710,379

(22) Filed: Sep. 20, 2017

(65) Prior Publication Data

US 2018/0010903 A1 Jan. 11, 2018

Related U.S. Application Data

(63) Continuation of application No. PCT/JP2015/081305, filed on Nov. 6, 2015.

(30) Foreign Application Priority Data

Mar. 27, 2015 (JP) ................................. 2015-065558

(51) Int. Cl.
*G06K 9/00* (2006.01)
*G01B 11/02* (2006.01)
(Continued)

(52) U.S. Cl.
CPC ............ *G01B 11/026* (2013.01); *G01B 11/25* (2013.01); *G01C 3/06* (2013.01); *G01S 17/42* (2013.01);
(Continued)

(58) Field of Classification Search
None
See application file for complete search history.

(56) References Cited

U.S. PATENT DOCUMENTS

| 2008/0075326 | A1* | 3/2008 | Otani ..................... G01C 3/00 382/106 |
| 2009/0161090 | A1* | 6/2009 | Campbell ............ A61B 3/0091 356/3 |

(Continued)

FOREIGN PATENT DOCUMENTS

| JP | 2005-221333 A | 8/2005 |
| JP | 2011-169701 A | 9/2011 |
| JP | 2012-134670 A | 7/2012 |

OTHER PUBLICATIONS

International Search Report (PCT/ISA/210) issued in PCT/JP2015/081305, dated Feb. 2, 2016.
(Continued)

*Primary Examiner* — Andrae S Allison
(74) *Attorney, Agent, or Firm* — Birch, Stewart, Kolasch & Birch, LLP

(57) ABSTRACT

The distance image acquisition apparatus (10) includes a projection unit (12) which projects a first pattern of structured light distributed in a two-dimensional manner with respect to a subject within a distance measurement region, a light modulation unit (22) which spatially modulates the first pattern projected from the projection unit (12), an imaging unit (14) which is provided in parallel with and apart from the projection unit (12) by a baseline length, and captures an image including the first pattern reflected from the subject within the distance measurement region, a pattern extraction unit (20A) which extracts the first pattern spatially modulated by the light modulation unit (22) from the image captured by the imaging unit (14), and a distance image acquisition unit (20B) which acquires a distance image (Continued)

indicating a distance of the subject within the distance measurement region based on the first pattern.

11 Claims, 16 Drawing Sheets

(51) Int. Cl.
  *G01B 11/25* (2006.01)
  *G01C 3/06* (2006.01)
  *G01S 17/42* (2006.01)
  *G01S 17/89* (2006.01)
  *G06T 7/521* (2017.01)

(52) U.S. Cl.
  CPC .............. *G01S 17/89* (2013.01); *G06T 7/521* (2017.01); *G06T 2207/10028* (2013.01)

(56) References Cited

U.S. PATENT DOCUMENTS

| | | | |
|---|---|---|---|
| 2010/0034426 A1* | 2/2010 | Takiguchi | G01C 21/3602 382/106 |
| 2010/0172546 A1* | 7/2010 | Sharp | G01B 11/26 382/106 |
| 2010/0322482 A1* | 12/2010 | Kochi | G01C 11/06 382/106 |
| 2012/0194650 A1 | 8/2012 | Izadi et al. | |
| 2013/0038882 A1 | 2/2013 | Umeda et al. | |
| 2014/0168630 A1* | 6/2014 | Iida | G01S 17/936 356/3 |
| 2014/0169635 A1* | 6/2014 | Nishimura | G01B 11/026 382/106 |
| 2014/0193039 A1* | 7/2014 | Wexler | G01C 11/04 382/106 |
| 2015/0348254 A1* | 12/2015 | Paik | G06T 7/004 382/106 |
| 2015/0377605 A1* | 12/2015 | Bridges | G06T 7/73 382/106 |
| 2016/0189387 A1* | 6/2016 | Kannan | G01B 11/2545 382/106 |

OTHER PUBLICATIONS

Maimone, Andrew et al. "Reducing Interference Between Multiple Structured Light Depth Sensors Using Motion" IEEE Virtual Reality 2012 pp. 51-54.
Written Opinion of the International Searching Authority (PCT/ISA/237) issued in PCT/JP2015/081305, dated Feb. 2, 2016.
Japanese Decision to Grant, dated Nov. 8, 2017, issued in Japanese Patent Application No. 2017-509153.

* cited by examiner

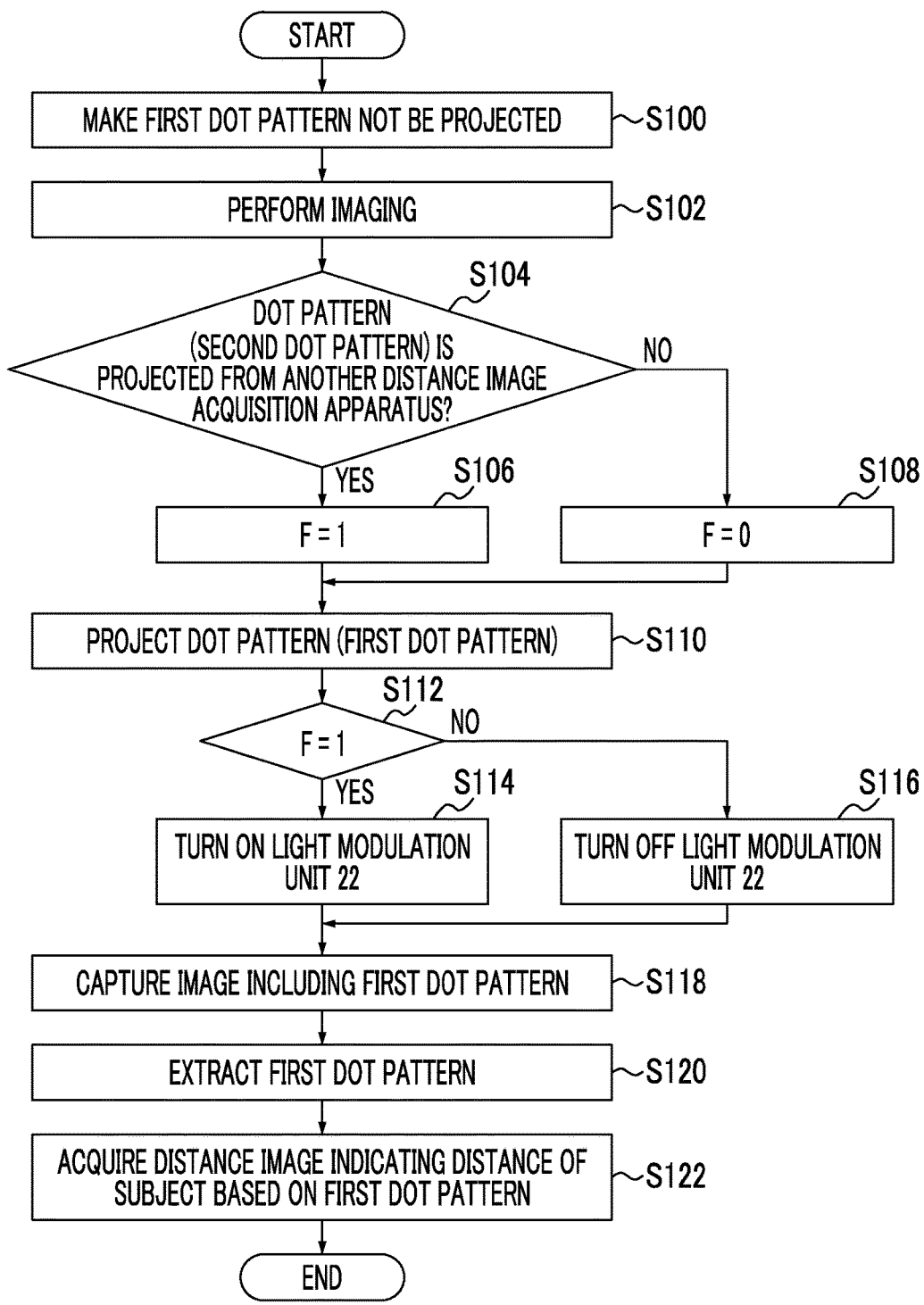

DISTANCE IMAGE ACQUISITION APPARATUS AND DISTANCE IMAGE ACQUISITION METHOD

CROSS-REFERENCE TO RELATED APPLICATIONS

The present application is a Continuation of PCT International Application No. PCT/JP2015/081305 filed on Nov. 6, 2015 claiming priority under 35 U.S.C § 119(a) to Japanese Patent Application No. 2015-65558 filed on Mar. 27, 2015. Each of the above applications is hereby expressly incorporated by reference, in their entirety, into the present application.

BACKGROUND OF THE INVENTION

1. Field of the Invention

The present invention relates to a distance image acquisition apparatus and a distance image acquisition method, and in particular, to a technique for projecting structured light distributed in a two-dimensional manner with respect to a subject within a distance measurement region and acquiring a distance image indicating a distance of the subject.

2. Description of the Related Art

Hitherto, this kind of distance image acquisition apparatus projects a pattern (dot pattern) of structured light distributed in a two-dimensional manner with respect to a subject within a distance measurement region from a projection unit, images the subject with an imaging unit, and acquires a first image including the dot pattern reflected from the subject. Furthermore, the distance image acquisition apparatus images the subject with the imaging unit without projecting a dot pattern from the projection unit, and acquires a second image to be a background of the dot pattern. Then, the second image is subtracted from the first image, and a subtraction result (an image having only the dot pattern) is stored in a memory. Thereafter, the distance image (three-dimensional distance information) is calculated and acquired based on the subtraction result stored in the memory using a triangulation method (JP2011-169701A).

However, there is a case where a distance measurement of an object having such a size that a distance image cannot be acquired with one distance image acquisition apparatus should be simultaneously performed with a plurality of distance image acquisition apparatuses. Furthermore, a user himself or herself may use the distance image acquisition apparatus without knowing that another person is using the distance image acquisition apparatus. In particular, in a case where a distance image is used for other purposes without being directly displayed or the like, and the user himself or herself is unaware of distance image acquisition being performed, there is a high possibility that the distance image acquisition apparatus is used simultaneously at the same place. In a case where a distance measurement of the same subject is performed simultaneously with a plurality of distance image acquisition apparatuses, dot patterns respectively projected from a plurality of distance image acquisition apparatuses are mixed, and there is a problem in that a distance image cannot be acquired.

In Andrew Maimone and Henry Fuchs, Reducing Interference Between Multiple Structured Light Depth Sensors Using Motion. IEEE Virtual Reality 2012 (Orange County, Calif., USA, Mar. 4-8, 2012), in order to solve this problem, an electric motor (eccentric motor) with an eccentric load fixed to a rotating shaft is attached to a bottom portion of a distance image acquisition apparatus, and the eccentric motor is driven at the time of imaging of a subject, thereby making and the entire apparatus vibrate at a high frequency.

With this, in the distance image acquisition apparatus as a host apparatus, the projection unit and the imaging unit vibrate synchronously. For this reason, the dot pattern projected from the host apparatus is imaged without blur, and the dot pattern projected from another apparatus is imaged with blur due to the vibration of the imaging unit. With this, the dot pattern projected from the host apparatus and the dot pattern projected from another apparatus are identified.

SUMMARY OF THE INVENTION

In the distance image acquisition apparatus described in Andrew Maimone and Henry Fuchs, Reducing Interference Between Multiple Structured Light Depth Sensors Using Motion. IEEE Virtual Reality 2012 (Orange County, Calif., USA, Mar. 4-8, 2012), since the entire apparatus is made to vibrate by the eccentric motor, it is necessary to retain the entire apparatus vibratably with a special retaining device, and there is a problem in that the host apparatus is not suitable for use in a handheld mode and lacks in portability.

In the distance image acquisition apparatus described in Andrew Maimone and Henry Fuchs, Reducing Interference Between Multiple Structured Light Depth Sensors Using Motion. IEEE Virtual Reality 2012 (Orange County, Calif., USA, Mar. 4-8, 2012), since the entire apparatus is made to vibrate at a high frequency, there is a problem in that the device (eccentric motor) which makes the host apparatus vibrate increases in size and becomes expensive, energy consumption increases, and noise is generated.

In general, although an imaging device which captures a monochrome image or a color image is mounted in a distance image acquisition apparatus, in a case of the distance image acquisition apparatus described in Andrew Maimone and Henry Fuchs, Reducing Interference Between Multiple Structured Light Depth Sensors Using Motion. IEEE Virtual Reality 2012 (Orange County, Calif., USA, Mar. 4-8, 2012), there is a problem in that an image to be captured is blurred since the imaging device also vibrates at the time of acquisition of the distance image.

The invention has been accomplished in consideration of such a situation, and an object of the invention is to provide a distance image acquisition apparatus and a distance image acquisition method capable of easily identifying a pattern projected from a host apparatus to acquire a distance image even if a pattern of structured light is irradiated from another apparatus simultaneously with the pattern projected from the host apparatus, and achieving use in a handheld mode, reduction in size of the host apparatus, and reduction in costs.

In order to attain the above-described object, a distance image acquisition apparatus according to an aspect of the invention comprises a projection unit which projects a first pattern of structured light distributed in a two-dimensional manner with respect to a subject within a distance measurement region, a light modulation unit which spatially modulates the first pattern projected from the projection unit, an imaging unit which is provided in parallel with and apart from the projection unit by a baseline length, and captures an image including the first pattern reflected from the subject within the distance measurement region, a pattern extraction unit which extracts the first pattern spatially modulated by the light modulation unit from the image captured by the imaging unit, and a distance image acquisition unit which acquires a distance image indicating a distance of the subject within the distance measurement region based on the first pattern extracted by the pattern extraction unit.

According to the aspect of the invention, since the first pattern of structured light projected from the projection unit is spatially modulated by the light modulation unit, the first pattern imaged by the imaging unit becomes a blurred pattern corresponding to spatial modulation by the light modulation unit. With this, even if another pattern of structured light is projected from another apparatus onto the same subject, it is possible to identify the first pattern projected from the host apparatus and another pattern projected from another apparatus to acquire the distance image indicating the distance of the subject. Since the first pattern is spatially modulated without making the imaging unit vibrate, the entire distance image acquisition apparatus does not vibrate. That is, since the entire apparatus does not vibrate, the distance image acquisition apparatus is usable in a handheld mode and is excellent in portability. In a case where a function of an imaging device which captures a color image is added to the distance image acquisition apparatus, it is possible to acquire a color image without shake simultaneously with the acquisition of the distance image.

According to another aspect of the invention, it is preferable that the distance image acquisition apparatus further comprises a determination unit which determines whether or not a second pattern of structured light is projected from another distance image acquisition apparatus, and in a case where the determination unit determines that the second pattern is projected from the another distance image acquisition apparatus, the light modulation unit spatially modulates the first pattern projected from the projection unit. That is, in a case where it is determined that the second pattern is not projected from another distance image acquisition apparatus, since the first pattern projected from the projection unit is not spatially modulated, it is possible to acquire the first pattern without blur.

According to a further aspect of the invention, in the distance image acquisition apparatus, it is preferable that the first pattern and the second pattern are dot patterns, and the determination unit determines that the second pattern is projected from the another distance image acquisition apparatus in a case where the number of dots of a dot pattern detected from the image captured by the imaging unit exceeds the number of dots of the first pattern projected from the projection unit.

According to still another aspect of the invention, in the distance image acquisition apparatus, it is preferable that the light modulation unit has a storage unit which stores a plurality of spatial modulation pattern for spatially modulating the first pattern, in a case where the determination unit determines that the second pattern is projected from the another distance image acquisition apparatus, and the first pattern projected from the projection unit and the second pattern projected from the another distance image acquisition apparatus are unidentifiable, selects a spatial modulation pattern for identification from the second pattern projected from the another distance image acquisition apparatus from the storage unit, and spatially modulates the first pattern projected from the projection unit according to the selected spatial modulation pattern.

In a case where another distance image acquisition apparatus spatially modulates the second pattern with the same modulation content (spatial modulation pattern) as the host apparatus, it is not possible to identify the first pattern and the second pattern. In this case, the first pattern is spatially modulated according to the spatial modulation pattern different from the spatial modulation pattern, with which another distance image acquisition apparatus spatially modulates the second pattern, whereby the first pattern and the second pattern can be identified.

According to still another aspect of the invention, it is preferable that the distance image acquisition apparatus further comprises a beacon information reception unit which receives beacon information transmitted from the another distance image acquisition apparatus, the beacon information indicating that the second pattern is projected from the another distance image acquisition apparatus, and in a case where the beacon information reception unit receives the beacon information, the determination unit determines that the second pattern is projected from the another distance image acquisition apparatus.

According to still another aspect of the invention, in the distance image acquisition apparatus, it is preferable that the beacon information includes spatial modulation information indicating a modulation content of spatial modulation of the second pattern, and the light modulation unit has a storage unit which stores a plurality of spatial modulation patterns having different modulation contents for spatially modulating the first pattern, in a case where the determination unit determines that the second pattern is projected from the another distance image acquisition apparatus, and the first pattern projected from the projection unit and the second pattern projected from the another distance image acquisition apparatus are unidentifiable, selects a spatial modulation pattern for enabling identification of the first pattern and the second pattern from the storage unit, and spatially modulates the first pattern projected from the projection unit according to the selected spatial modulation pattern.

According to still another aspect of the invention, in the distance image acquisition apparatus, it is preferable that the light modulation unit has a storage unit which stores a plurality of spatial modulation patterns having different modulation contents for spatially modulating the first pattern, reads the spatial modulation pattern from among the plurality of spatial modulation patterns stored in the storage unit in sequence or in a random manner, and spatially modulates the first pattern projected from the projection unit according to the read spatial modulation pattern.

A blur shape of the first pattern is known by the read spatial modulation pattern. Accordingly, the blur shape (spatial modulation pattern) of the first pattern is changed in sequence or in a random manner, whereby it is possible to determine that a pattern having a blur shape different from the blur shape of the first pattern is a pattern projected from another apparatus even if the pattern projected from another apparatus is spatially modulated.

According to still another aspect of the invention, in the distance image acquisition apparatus, it is preferable that the light modulation unit is a vibrator which makes the projection unit or a projection optical system of the projection unit vibrate. Since a target which is made to vibrate by the light modulation unit is small compared to the entire distance image acquisition apparatus, the light modulation unit can also be reduced in size and costs, and can be prevented from becoming a source of noise.

According to still another aspect of the invention, in the distance image acquisition apparatus, it is preferable that the vibrator is a piezoelectric element or a voice coil type vibrator.

According to still another aspect of the invention, in the distance image acquisition apparatus, it is preferable that the light modulation unit is a digital micromirror device which has a micromirror group, into which the first pattern projected from the projection unit enters, and makes the micromirror group oscillate to spatially modulate the first pattern reflected by the micromirror group. Since the digital micromirror device spatially modulates the first pattern by making the micromirror group oscillate without making the projection unit or the like vibrate mechanically, the digital micromirror device does not cause mechanical vibration and does not become a noise source.

According to still another aspect of the invention, it is preferable that the distance image acquisition apparatus further comprises a region determination unit which determines an overlap region where the distance measurement region where the first pattern is projected and a projection region of a second pattern of structured light projected from another distance image acquisition apparatus overlap each other, and the light modulation unit makes only a micromirror corresponding to the overlap region determined by the region determination unit out of the micromirror group of the digital micromirror device oscillate. The projection region of the first pattern and the projection region of the second pattern rarely completely overlap each other. Accordingly, only the micromirror corresponding to the overlap region is made to oscillate, whereby it is possible to enable identification of the first pattern and the second pattern. Meanwhile, since the first pattern corresponding to a non-overlap region is not spatially modulated, the first pattern can be imaged as a pattern without blur.

According to still another aspect of the invention, in the distance image acquisition apparatus, it is preferable that light of the first pattern is near infrared light, and the imaging unit has sensitivity to a wavelength bandwidth of at least near infrared light. With this, in a case where the distance image acquisition apparatus is used in a room with only an artificial lighting (lighting not including near infrared light) or is used in the nighttime, it is possible to image only the first pattern. Even if near infrared light is included in ambient light, since near infrared light out of ambient light is sufficiently smaller than the light of the first pattern to be projected, it is possible to easily extract the first pattern, for example, through binarization processing.

According to still another aspect of the invention, in the distance image acquisition apparatus, it is preferable that the imaging unit has an image sensor in which a first light receiving element having sensitivity to a wavelength bandwidth of near infrared light and a second light receiving element having sensitivity to a wavelength bandwidth of visible light are mixed and arranged in a two-dimensional manner, the pattern extraction unit extracts the first pattern spatially modulated by the light modulation unit from an image acquired by the first light receiving element of the image sensor, and the distance image acquisition apparatus further comprises a visible light image generation unit which generates a visible light image of the subject within the distance measurement region from an image acquired by the second light receiving element of the image sensor. With this, it is possible to simultaneously acquire the distance image and the visible light image having the same angle of view based on the output of one image sensor.

A distance image acquisition method according to still another aspect of the invention comprises a step of projecting a first pattern of structured light distributed in a two-dimensional manner with respect to a subject within a distance measurement region from a projection unit, a step of spatially modulating the first pattern projected from the projection unit, a step of capturing an image including the first pattern reflected from the subject within the distance measurement region with an imaging unit provided in parallel with and apart from the projection unit by a baseline length, a step of extracting the spatially modulated first pattern based on the image captured by the imaging unit, and a step of acquiring a distance image indicating a distance of the subject within the distance measurement region based on the extracted first pattern.

According to still another aspect of the invention, it is preferable that the distance image acquisition method further comprises a step of determining whether or not a second pattern different from the first pattern projected from the projection unit is projected, and in the step of spatially modulating the first pattern, in a case where it is determined that the second pattern is projected, the first pattern is spatially modulated.

According to still another aspect of the invention, in the distance image acquisition method, it is preferable that the first pattern and the second pattern are dot patterns, and in the step of determining, it is determined that the second pattern is projected in a case where the number of dots of a dot pattern detected from the image captured by the imaging unit exceeds the number of dots of the first pattern.

According to still another aspect of the invention, in the distance image acquisition method, it is preferable that, in the step of spatially modulating, in a case where it is determined in the step of determining that the second pattern is projected, and the first pattern and the second pattern are unidentifiable, the first pattern projected from the projection unit is spatially modulated according to a spatial modulation pattern for enabling identification of the first pattern and the second pattern.

According to the invention, since only the first pattern of structured light projected with respect to the subject within the distance measurement region is spatially modulated, even if the same subject is irradiated with another pattern of structured light from another apparatus simultaneously with the first pattern, it is possible to acquire a distance image indicating a distance of the subject by easily identifying the first pattern projected from the host apparatus. In particular, since the entire apparatus does not vibrate, it is possible to allow use in a handheld mode and to realize reduction in size of the host apparatus and reduction in costs.

BRIEF DESCRIPTION OF THE DRAWINGS

FIG. 13 is a flowchart showing a second embodiment of a distance image acquisition method according to the invention.

DESCRIPTION OF THE PREFERRED EMBODIMENTS

Hereinafter, an embodiment of a distance image acquisition apparatus and a distance image acquisition method according to the invention will be described referring to the accompanying drawings.

[Distance Image Acquisition Apparatus]

Figure 1:
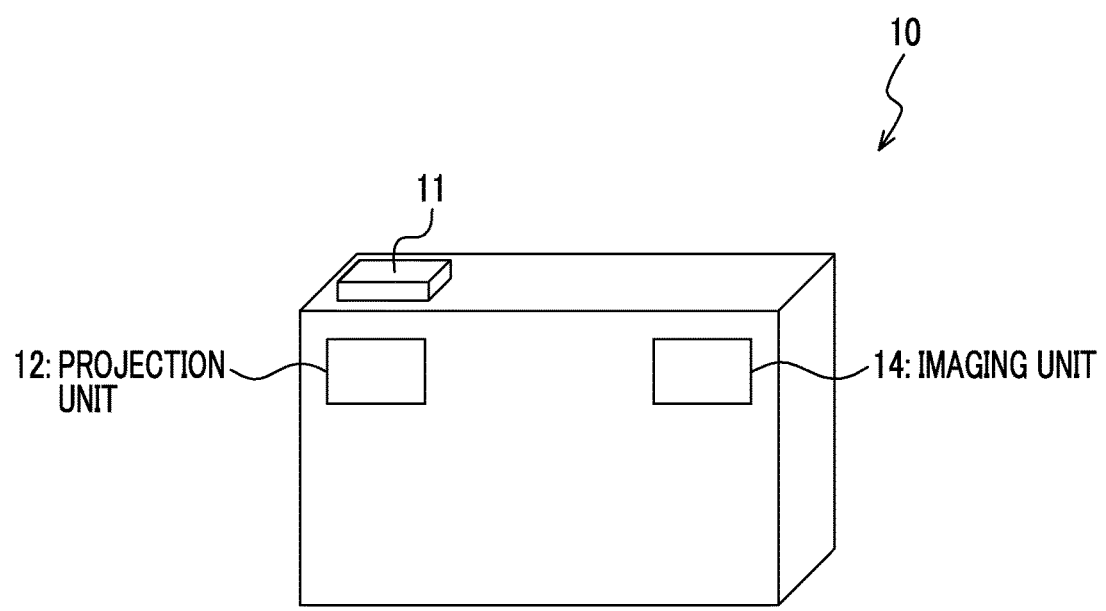
FIG. 1 is an appearance diagram showing a first embodiment of a distance image acquisition apparatus 10 according to the invention.

FIG. 1 is an appearance diagram showing a first embodiment of a distance image acquisition apparatus 10 according to the invention.

As shown in FIG. 1, the distance image acquisition apparatus 10 has a projection unit 12 and an imaging unit 14. Though will be described below in detail, in a case where an imaging instruction input by the operation of the shutter button 11 is applied, the distance image acquisition apparatus 10 acquires a distance image indicating a distance (depth information) of a subject within an imaging region (distance measurement region).

Figure 3:
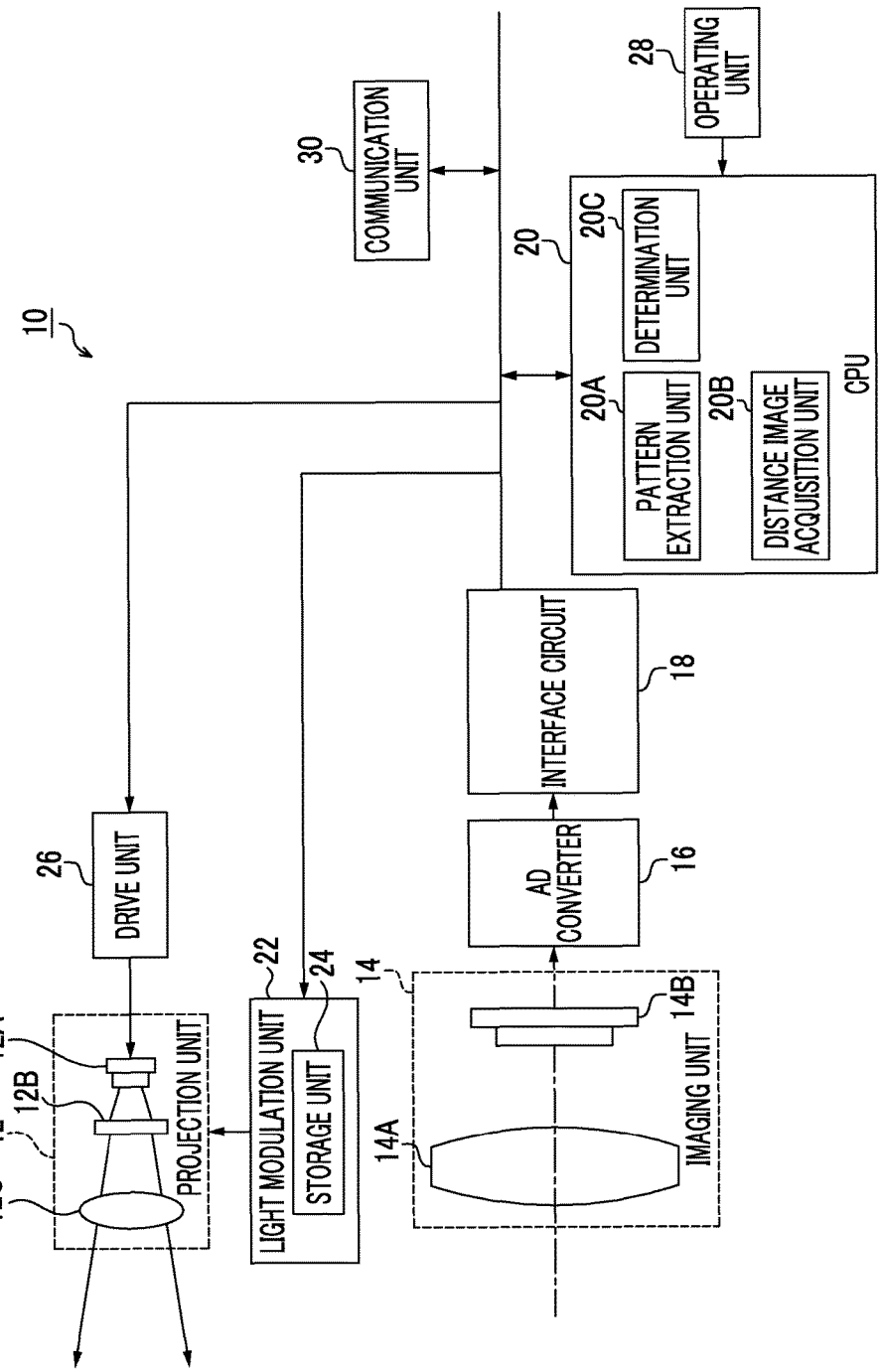
FIG. 3 is a block diagram showing an internal configuration example of the distance image acquisition apparatus.

The distance image acquisition apparatus 10 has a static image mode in which a distance image for one frame is acquired like static image capturing and a video mode in which a distance image continuous at a predetermined frame rate (for example, 30 frames/second, 60 frames/second) is acquired like video capturing. The static image mode and the video mode can be appropriately selected by an operation of a mode selection unit of an operating unit 28 (FIG. 3). Then, in a case where a shutter button 11 is operated with one push when the static image mode is selected, a distance image for one frame is acquired. In a case where the shutter button 11 is operated with one push when the video mode is selected, acquisition of a distance image continuous at a predetermined frame rate is started, and in a case where the shutter button 11 is operated with one push again, distance image acquisition is stopped.

Figure 2:
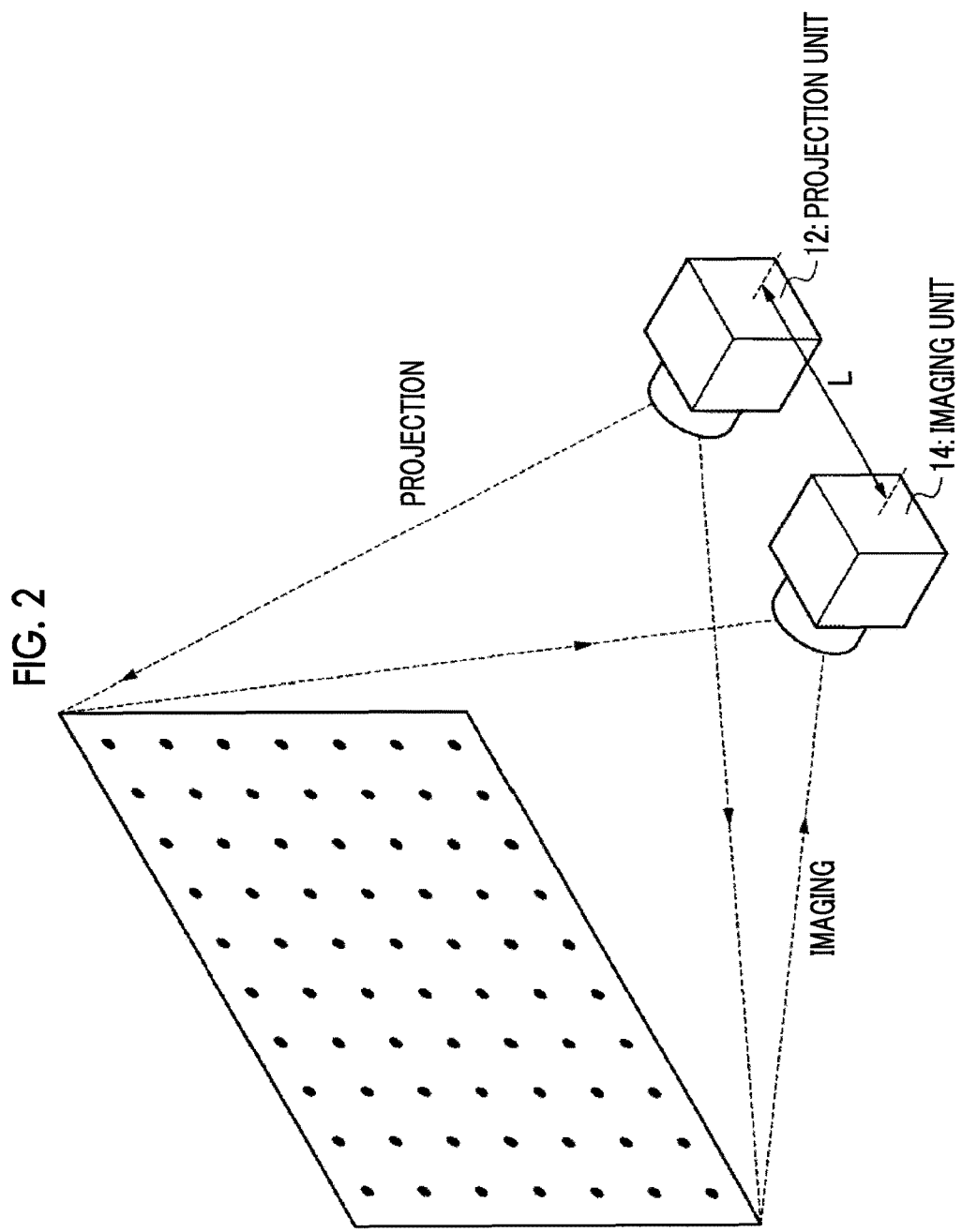
FIG. 2 is a diagram illustrating the principle of distance image acquisition in the distance image acquisition apparatus.

FIG. 2 is a diagram illustrating the principle of distance image acquisition in the distance image acquisition apparatus 10.

As shown in FIG. 2, at the time of acquisition of the distance image, the projection unit 12 projects a pattern (first pattern) of structured light distributed in a two-dimensional manner with respect to a subject within a distance measurement region. In this embodiment, as the first pattern of structured light, a matrix-shaped dot pattern is projected onto the subject. Hereinafter, the first pattern of structured light projected from the projection unit 12 is referred to as a "first dot pattern".

The imaging unit 14 captures an image including the first dot pattern reflected from the subject. As shown in FIG. 2, the imaging unit 14 is provided in parallel with and apart from the projection unit 12 by a baseline length L, and parallax according to the distance of the subject is generated between the corresponding dots of the first dot pattern projected from the projection unit 12 and the first dot pattern imaged by the imaging unit 14. Accordingly, it is possible to obtain the distance image indicating the distance of the subject based on a light receiving position (not shown) of each dot of the first dot pattern projected from the projection unit 12 on an image sensor imaged by the imaging unit 14 using a triangulation method.

Figure 8:
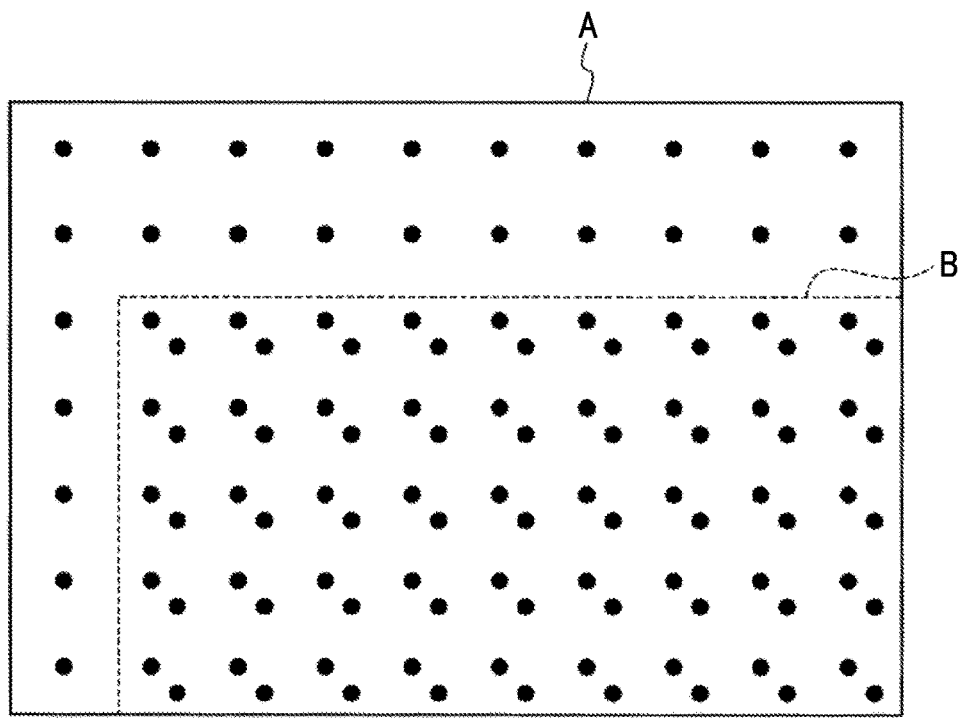
FIG. 8 is a diagram showing an example of a near infrared image which is captured by the imaging unit and is an image including a first dot pattern projected from the host apparatus and a second dot pattern projected from another apparatus.

As shown in FIGS. 2 and 8, although the projection unit 12 of this embodiment projects the matrix-shaped first dot pattern, the invention is not limited thereto, and the projection unit 12 may project a dot pattern in which a dot interval is random (pseudo random) or a mesh-shaped pattern.

FIG. 3 is a block diagram showing an internal configuration example of the distance image acquisition apparatus 10.

The distance image acquisition apparatus 10 shown in FIG. 3 comprises, in addition to the projection unit 12 and the imaging unit 14 described above, an analog-to-digital (AD) converter 16, an interface circuit 18, a central processing unit (CPU) 20, a light modulation unit 22, a drive unit 26, an operating unit 28, and a communication unit 30.

The projection unit 12 has a near infrared light emitting diode (near infrared LED) 12A, a diffraction optical element 12B, and a projection lens 12C functioning as a projection optical system.

The diffraction optical element 12B functions as an element which converts a light intensity distribution using a diffraction phenomenon of light. In this example, near infrared light emitted from the near infrared LED 12A enters the diffraction optical element 12B, and the diffraction optical element 12B converts near infrared light to the matrix-shaped first dot pattern shown in FIG. 2. The projection lens 12C projects the first dot pattern of near infrared light converted by the diffraction optical element 12B onto the subject within the distance measurement region, which is the same as the imaging region (distance measurement region) of the imaging unit 14.

The imaging unit 14 is constituted of an imaging lens 14A and an image sensor 14B. The imaging lens 14A images reflected light (a light image including the first dot pattern projected from the projection unit 12 and reflected from the subject) from the subject on the image sensor 14B.

The image sensor 14B is constituted of a complementary metal-oxide semiconductor (CMOS) driver which has a vertical driver, a horizontal driver, and the like, and a CMOS type image sensor which is driven by a timing generator. The image sensor 14B is not limited to a CMOS type, and may be an XY address type or charge coupled device (CCD) type image sensor.

The image sensor 14B has a plurality of light receiving elements (photodiodes) arranged in a two-dimensional manner, and is provided with, on an incidence surface of a plurality of light receiving elements, a band-pass filter which transmits only a wavelength bandwidth of the first dot pattern of near infrared light projected from the projection unit 12 or a visible light cut filter which eliminates visible light. With this, a plurality of light receiving elements of the image sensor 14B function as pixels having sensitivity to near infrared light.

In the image sensor 14B, an exposure period is controlled according to a timing signal (shutter control signal) applied from the timing generator (not shown), and electric charge corresponding to the amount of near infrared light entering in the exposure period is accumulated in each light receiving element of the image sensor 14B. Then, a pixel signal (an analog signal corresponding to electric charge accumulated in each pixel) according to the amount of incident light of the first dot pattern reflected from the subject is read from the image sensor 14B. In a case where the subject is irradiated with ambient light and a component in the wavelength bandwidth of near infrared light is included in ambient light, the component in the wavelength bandwidth of near infrared light out of ambient light is included in the pixel signal as a noise signal.

The analog signal read from the image sensor 14B is converted to a digital signal (image data) by the AD converter 16, and is loaded on the CPU 20 by way of the interface circuit 18 functioning as an image input controller. A CMOS type image sensor may include an AD converter, and in this case, the AD converter 16 may be omitted.

Though details will be described below, the CPU 20 has a function as a device control unit which performs exposure control of the distance image acquisition apparatus 10 and integrally controls the respective units, such as the light modulation unit 22 and the drive unit 26 according to an instruction input on the operating unit 28, and a function as a pattern extraction unit 20A, a distance image acquisition unit 20B, and a determination unit 20C.

The pattern extraction unit 20A is a part which extracts the first dot pattern from image data input through the interface circuit 18. For example, the pattern extraction unit 20A extracts image data (binary image data) indicating only the first dot pattern by setting a proper threshold value and binarizing input image data based on the threshold value.

The distance image acquisition unit 20B obtains the position (for example, the position of the center of gravity of each dot) of each dot of the first dot pattern on the image sensor 14B based on binary image data of the first dot pattern extracted by the pattern extraction unit 20A, calculates the distance of the subject for each dot based on the obtained position of each dot of the first dot pattern on the image sensor 14B, and thus, acquires (generates) the distance image indicating the distance of the subject within the distance measurement region. While the distance image is two-dimensional distance information indicating the distance of the subject within the distance measurement region, the distance image can be visually recognized as an image by substituting the distance information with a brightness value or color information corresponding to the distance.

The determination unit 20C is a part which determines whether or not a pattern (second pattern) of structured light is projected from another distance image acquisition apparatus (hereinafter, simply referred to as "another apparatus"). In a case where the second pattern is projected from another apparatus, and the second pattern is a dot pattern (second dot pattern) like the first dot pattern, it is not possible to identify whether the dot pattern extracted by the pattern extraction unit 20A is the first dot pattern projected from the host apparatus or the second dot pattern projected from another apparatus.

The determination unit 20C counts the number of dots of the dot pattern extracted by the pattern extraction unit 20A, and in a case where the counted number of dots exceeds the number of dots of the first dot pattern, can determine that the second dot pattern is projected from another apparatus.

The communication unit 30 is a short-distance wireless communication unit which performs wireless communication with another apparatus or an access point, and functions as a beacon information reception unit which receives beacon information transmitted from another apparatus directly or through the access point. The determination unit 20C can determine whether or not there is another apparatus within a communicable range (that is, whether or not the second dot pattern is projected from another apparatus) according to a reception result of the beacon information from the communication unit 30. The beacon information can include information indicating the pattern (the second dot pattern corresponding to the second pattern) of structured light projected from another apparatus, and in a case where the second dot pattern is spatially modulated as described below, spatial modulation information indicating a modulation content of spatial modulation. In this case, the determination unit 20C can acquire information (the shape of the second dot pattern, the spatial modulation information indicating the modulation content of spatial modulation, or the like) relating to the second dot pattern projected from another apparatus based on the beacon information received through the communication unit 30.

In a case where the second dot pattern is projected from another apparatus with respect to the same subject, the pattern extraction unit 20A extracts the first dot pattern projected from the host apparatus and the second dot pattern projected from another apparatus. Meanwhile, in this case, in a case where the first dot pattern and the second dot pattern have the same shape (for example, a circular dot), it is not possible to identify both dot patterns.

Accordingly, in a case where the pattern extraction unit 20A is unable to identify the first pattern and the second pattern, the CPU 20 outputs a modulation command or the like to spatially modulate the first pattern (first dot pattern) projected from the projection unit 12 of the host apparatus to the light modulation unit 22.

The light modulation unit 22 spatially modulates the first dot pattern projected from the projection unit 12. It is preferable that the light modulation unit 22 comprises a storage unit 24 which stores a plurality of spatial modulation patterns for spatially modulating the first dot pattern, selects the spatial modulation pattern for allowing identification from the second dot pattern projected from another apparatus from the storage unit 24, and spatially modulates the first dot pattern projected from the projection unit 12 according to the selected spatial modulation pattern.

The operating unit 28 includes a power switch, the shutter button 11, the mode selection unit, and the like, and an instruction input on the operating unit 28 is applied to the CPU 20. The communication unit 30 is a part which performs short-distance wireless communication with other peripherals or an access point, and in this example, performs transmission and reception of the beacon information and the like with the another distance image acquisition apparatus.

[Light Modulation Unit]

Next, a light modulation unit 22 of a first embodiment will be described in detail. The light modulation unit 22 of the first embodiment includes a vibrator which makes the projection unit 12 or the projection lens 12C vibrate.

Figure 4:
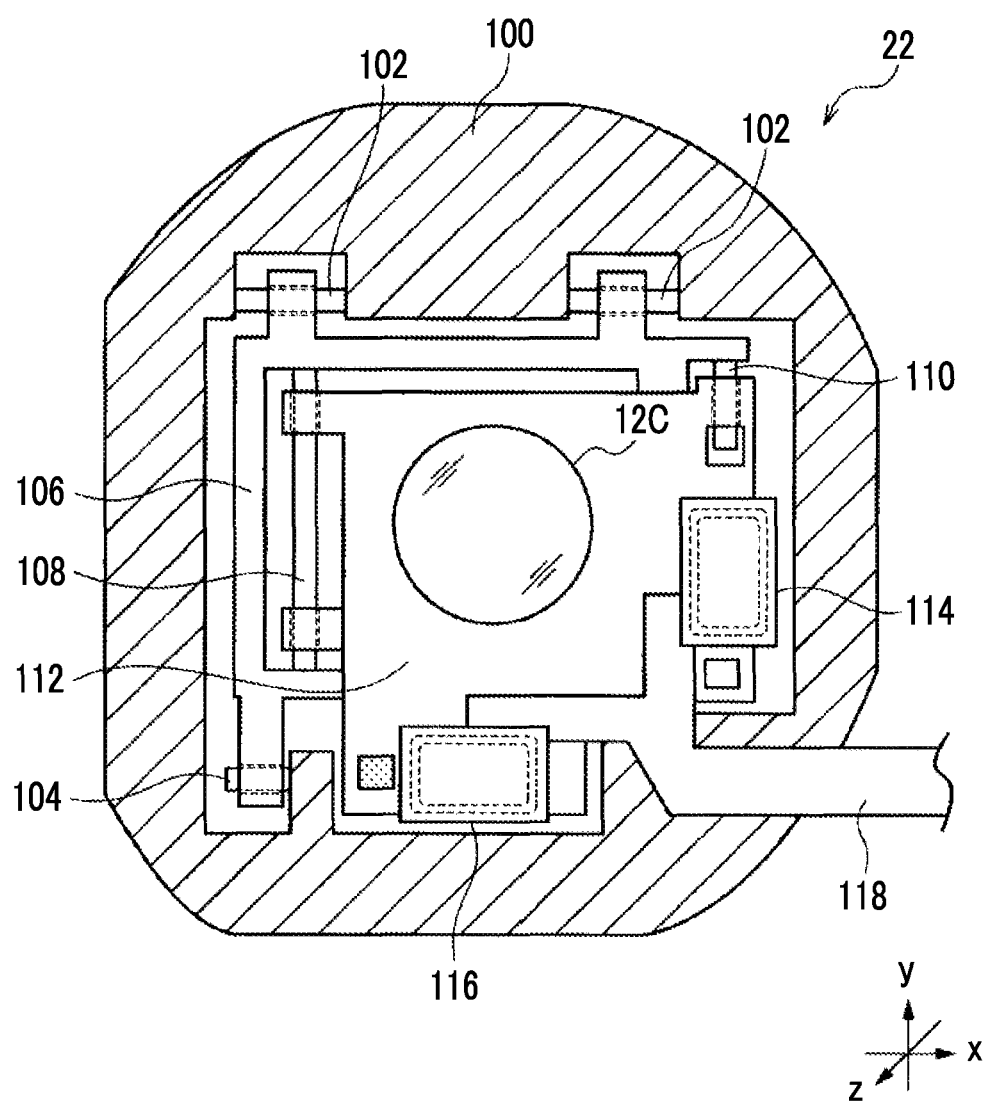
FIG. 4 is a configuration diagram showing a main part of a first embodiment of a light modulation unit.

FIG. 4 is a configuration diagram showing a main part of the first embodiment of the light modulation unit 22, and in particular, shows a vibration mechanism which makes the projection lens 12C vibrate at a high frequency in a horizontal direction (x direction) and a vertical direction (y direction) orthogonal to an optical axis direction (z direction).

The vibration mechanism of the light modulation unit 22 shown in FIG. 4 has the same configuration as a camera shake correction mechanism which is applied to a general camera, and is primarily constituted of a slide member 106 guided movably in the x direction by a main guide shaft 102 provided in a base member 100 and a rotation stopping guide shaft 104, a moving member 112 guided movably in the y direction by a sub-guide shaft 108 provided in the slide member 106 and a rotation stopping guide shaft 110, voice coil type vibrators 114 and 116 with a magnet fixed on the base member 100 side and a coil fixed on the moving member 112 side, and a printed board 118 which supplies a drive signal to the voice coil type vibrators 114 and 116. The projection lens of the projection unit 12 is held by the moving member 112.

In a case where the high-frequency drive signal is applied through the printed board 118, the voice coil type vibrator 114 makes the slide member 106 and the moving member 112 vibrate in the x direction. In a case where the high-frequency drive signal is applied through the printed board 118, the voice coil type vibrator 116 makes the moving member 112 vibrate in the y direction.

That is, in a case where the moving member 112 vibrates in the x direction or the y direction by the voice coil type vibrator 114 or 116, the projection lens vibrates in the x direction or the y direction along with the moving member 112, and thus, the first dot pattern projected from the projection lens 12C is made to vibrate (spatially modulated) in the x direction or the y direction.

Although the light modulation unit 22 of the first embodiment uses the voice coil type vibrator 114 or 116 as the vibrator, which makes the projection lens 12C vibrate, the invention is not limited thereto, and for example, a piezoelectric element can be used.

Figure 5:
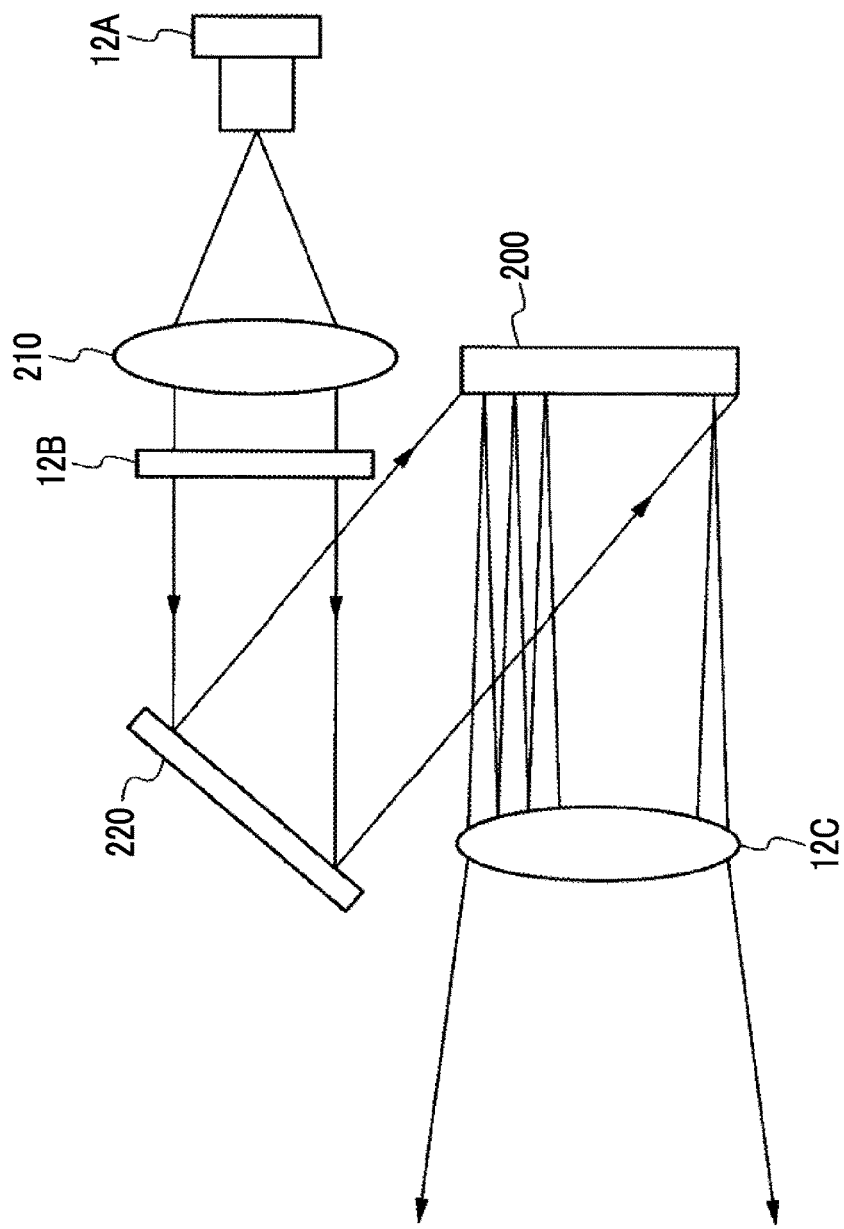
FIG. 5 is a diagram showing the configuration of a projection unit including a second embodiment of a light modulation unit.

FIG. 5 is a diagram showing the configuration of a projection unit 12 including a second embodiment of a light modulation unit 22. In FIG. 5, portions common with the projection unit 12 shown in FIG. 3 are represented by the same reference numerals, and detailed description thereof will not be repeated.

The light modulation unit 22 of the second embodiment is primarily constituted of a digital micromirror device (DMD) 200. Near infrared light emitted from the near infrared LED 12A is corrected to parallel light by a collimator lens 210, enters the diffraction optical element 12B, and is converted to the matrix-shaped first dot pattern in the diffraction optical element 12B. Each dot of the first dot pattern of near infrared light converted by the diffraction optical element 12B enters a micromirror 200A (see FIG. 6) constituting the DMD 200 by way of a reflection mirror 220.

Figure 6:
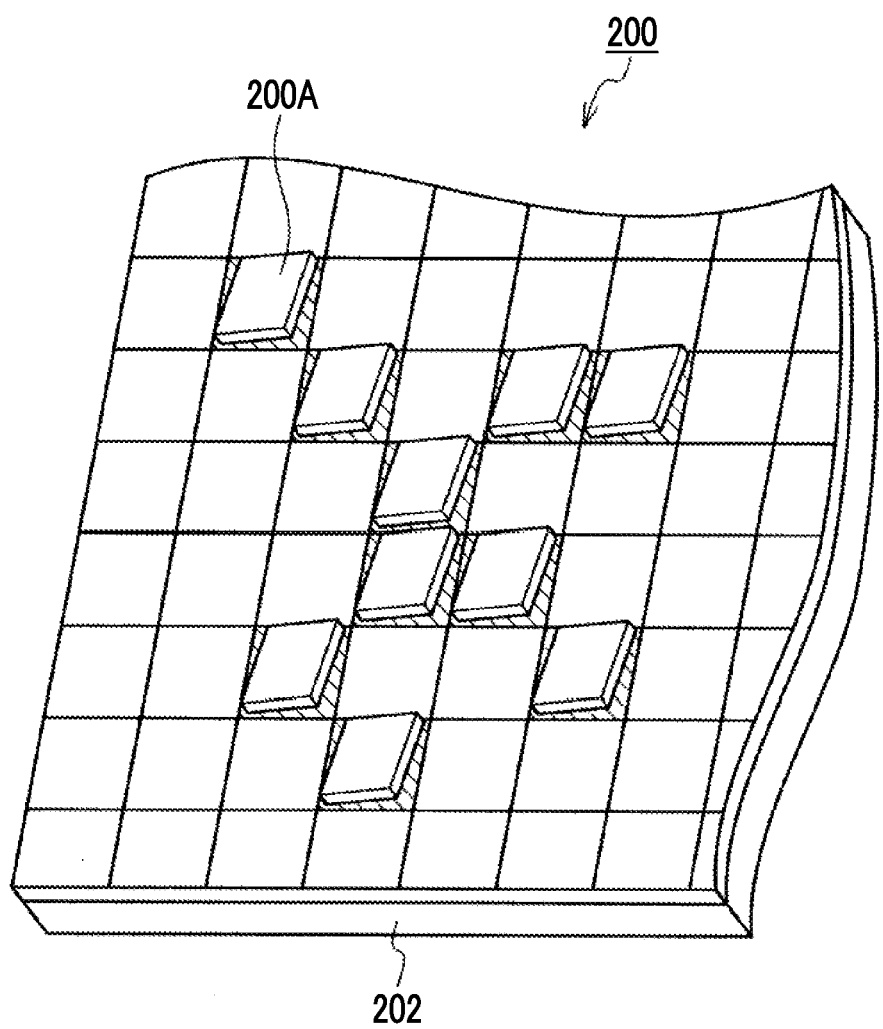
FIG. 6 is a perspective view showing the configuration of a digital micromirror device.

FIG. 6 is a perspective view showing the configuration of the DMD 200. As shown in FIG. 6, the DMD 200 is constituted of a micromirror group in which a large number (substantially the same as the number of dots of the first dot pattern) of micromirrors 200A are arranged in a lattice shape. Each micromirror 200A is supported on a memory cell 202 constituted of a silicon gate CMOS, which temporarily stores drive information of the micromirror, a pillar including a hinge and a yoke (not shown). A material having high reflectance, such as aluminum, is deposited on the surface of the micromirror 200A to form a light reflective surface. The first dot pattern reflected by each micromirror 200A is spatially modulated by the DMD 200, and is then projected onto the subject within the distance measurement region by the projection lens 12C.

The DMD 200 functioning as the light modulation unit 22 of the second embodiment can spatially modulate the first dot pattern by making each micromirror 200A of the micromirror group, into which the first dot pattern enters, oscillate at a high frequency. The DMD 200 can individually control the micromirrors 200A constituting the micromirror group. Though will be described below in detail, it is preferable that the DMD 200 selects the micromirror to oscillate and makes only the selected micromirror oscillate.

Next, a method of identifying the first dot pattern projected from the host apparatus and the second dot pattern projected from another apparatus will be described referring to FIGS. 7 to 11.

Figure 7:
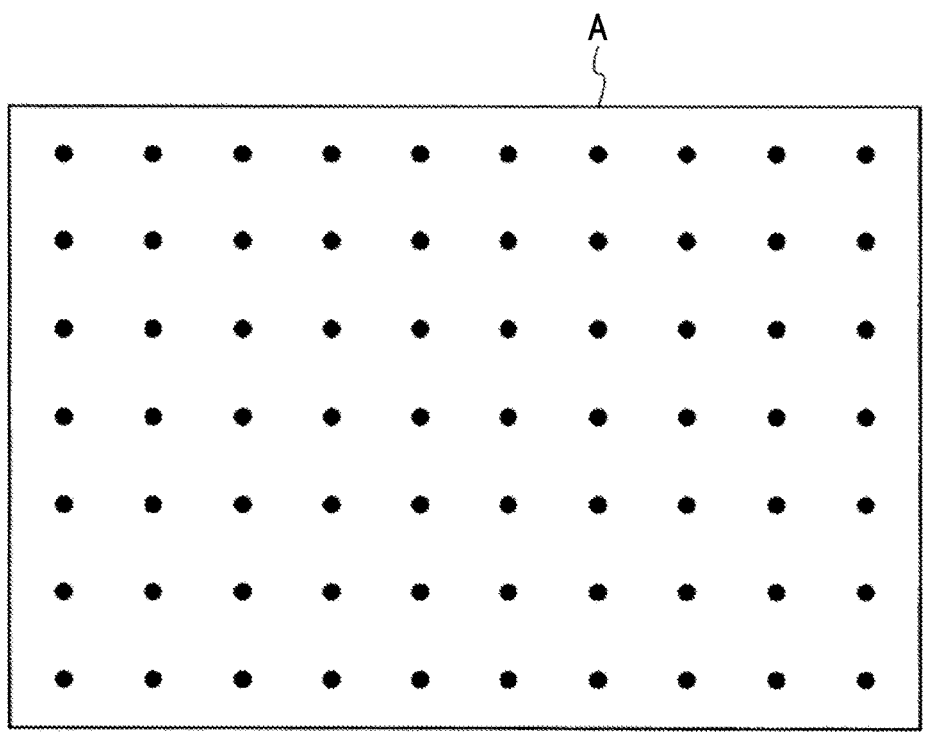
FIG. 7 is a diagram showing an example of a near infrared image which is captured by an imaging unit and is an image including a first dot pattern reflected from a subject within a distance measurement region.

FIG. 7 is a diagram showing an example of a near infrared image which is captured by the imaging unit 14 and is an image including a first dot pattern reflected from a subject within a distance measurement region A. FIG. 7 shows an image including only the first dot pattern projected from the host apparatus. For simplification of description, it is assumed that the subject within the subject distance measurement region A is a flat surface having a constant distance.

As shown in FIG. 7, the first dot pattern projected onto the flat surface having a constant distance has the same dot interval. The dot interval becomes an interval corresponding to the distance between the imaging unit 14 and the subject (flat surface).

FIG. 8 is a diagram showing an example of a near infrared image which is captured by the imaging unit 14 and is an image including a first dot pattern projected from the host apparatus and a second dot pattern projected from another apparatus.

In FIG. 8, a distance measurement region A where the first dot pattern of the host apparatus is projected includes an overlap region B where the first dot pattern of the host apparatus and the second dot pattern of another apparatus overlap each other. In this case, since the first dot pattern and the second dot pattern have the same dot shape, it is not possible to identify the first dot pattern and the second dot pattern with the image.

The distance image acquisition apparatus 10 spatially modulates the first dot pattern projected from the host apparatus with the light modulation unit 22 in order to enable identification of the first dot pattern of the host apparatus and the second dot pattern of another apparatus.

Figure 9:
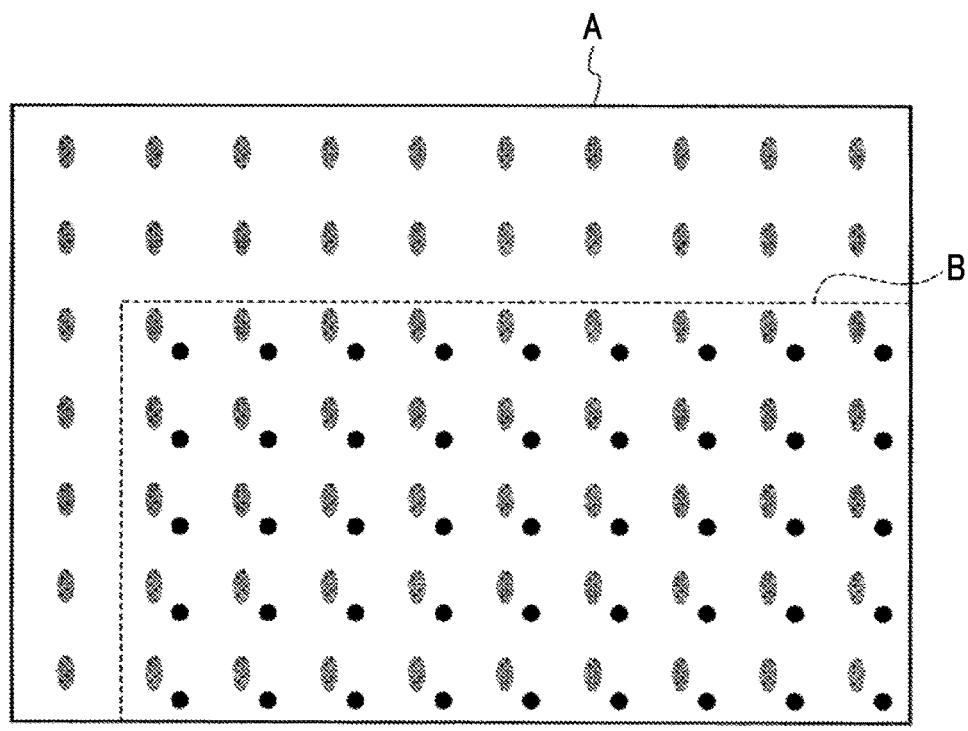
FIG. 9 is a diagram showing a near infrared image which includes the first dot pattern and the second dot pattern shown in FIG. 8 and is an image captured in a state where a projection lens is made to vibrate in an up-down direction by the light modulation unit.

FIG. 9 is a diagram showing a near infrared image which includes the first dot pattern and the second dot pattern shown in FIG. 8 and is an image captured in a state where the projection lens 12C is made to vibrate in an up-down direction (the y direction shown in FIG. 4) by the light modulation unit 22.

In this case, since only the first dot pattern projected from the projection unit 12 of the host apparatus is spatially modulated in the up-down direction, as shown in FIG. 9, the shape of each dot of the first dot pattern becomes an oval shape or an elliptical shape elongated in the up-down direction.

Accordingly, even if the overlap region B where the first dot pattern of the host apparatus and the second dot pattern of another apparatus overlap each other is present in the distance measurement region A where the first dot pattern of the host apparatus is projected, the pattern extraction unit 20A can extract only the first dot pattern (oval or elliptical dot pattern) spatially modulated by the light modulation unit 22 from the difference in dot shape between the first dot pattern and the second dot pattern.

The pattern extraction unit 20A can acquire information indicating a spatial modulation pattern (that is, the shape of each dot of the first dot pattern corresponding to the spatial modulation pattern) for spatially modulating the first dot pattern with the light modulation unit 22 from the CPU 20 or the light modulation unit 22, and can extract only the first dot pattern having the dot shape corresponding to the spatial modulation pattern.

Figure 10:
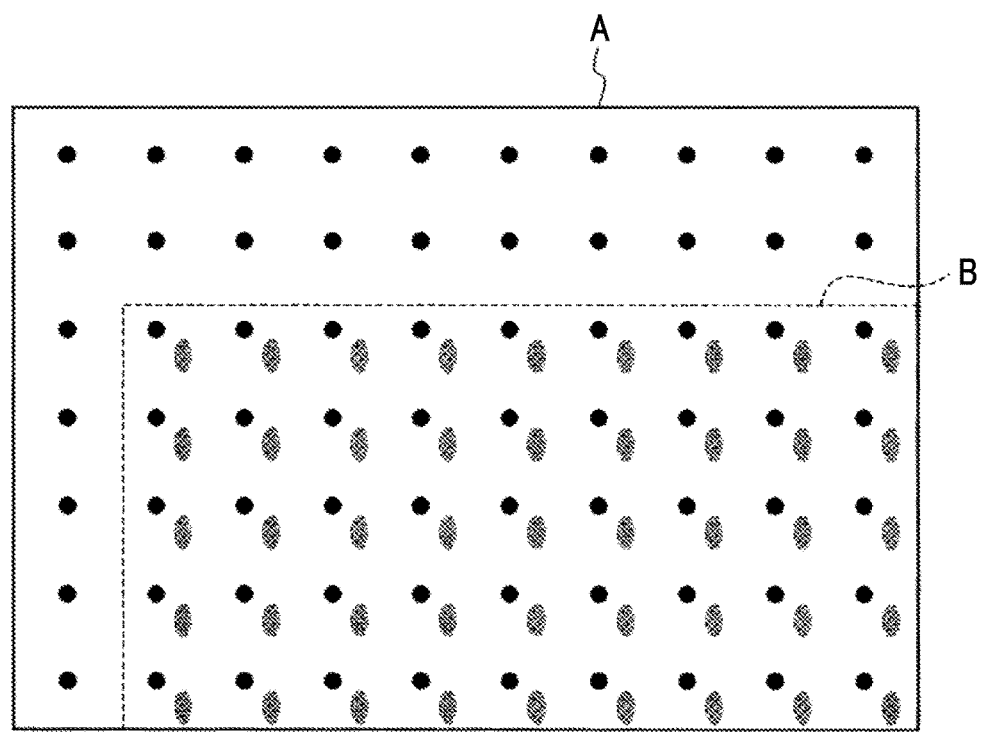
FIG. 10 is a diagram showing a near infrared image which includes the first dot pattern and the second dot pattern shown in FIG. 8 and is an image in which the second dot pattern is spatially modulated.

FIG. 10 shows a near infrared image including the first dot pattern and the second dot pattern shown in FIG. 8 in a case where the second dot pattern projected from another apparatus is spatially modulated.

In this case, in an overlap region B of the first dot pattern and the second dot pattern, the dot shape of the second dot pattern projected from another apparatus is not a circular shape due to spatial modulation. Accordingly, even if the overlap region B where the first dot pattern of the host apparatus and the second dot pattern of another apparatus overlap each other is present in the distance measurement region A where the first dot pattern of the host apparatus is projected, the pattern extraction unit 20A can extract only the first dot pattern (circular dot pattern) from the difference in dot shape between the first dot pattern and the second dot pattern.

That is, in a case where the second dot pattern of another apparatus is spatially modulated, it is preferable that the CPU 20 turns off the light modulation unit 22 of the host apparatus so as not to spatially modulate the first dot pattern.

Figure 11:
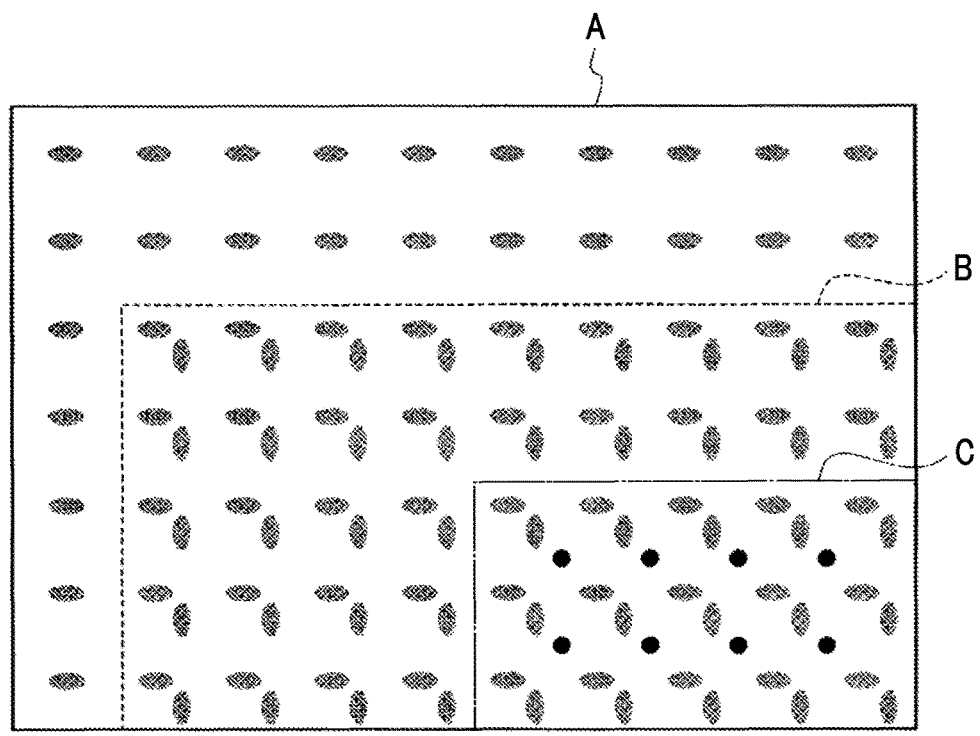
FIG. 11 is a diagram showing a near infrared image which includes a first dot pattern and a second dot pattern and is an image in which one second dot pattern out of second dot patterns respectively projected from two other apparatuses is spatially modulated.

FIG. 11 shows a near infrared image including a first dot pattern and a second dot pattern in a case where second dot patterns are projected from two other apparatuses and the second dot pattern projected from one of two other apparatuses is spatially modulated.

In FIG. 11, in an overlap region B where the first dot pattern projected from the host apparatus and the spatially modulated second dot pattern projected from one of two other apparatuses overlap each other, an overlap region C where the first dot pattern, the spatially modulated second dot pattern, and the non-spatially modulated second dot pattern projected from the other of two other apparatuses overlap one another is present.

In this case, in a case where the first dot pattern of the host apparatus is not spatially modulated as shown in FIG. 10, in the overlap region C, it is not possible to identify the first dot pattern and the non-spatially modulated second dot pattern projected from the other of two other apparatuses.

Accordingly, the first dot pattern projected from the host apparatus is spatially modulated, and in order to enable identification of the spatially modulated first dot pattern and the non-spatially modulated second dot pattern and identification of the spatially modulated first dot pattern and the spatially modulated second dot pattern, the first dot pattern is spatially modulated with a spatial modulation pattern different from a spatial modulation pattern of the second dot pattern.

In the example shown in FIG. 11, the projection lens 12C is made to vibrate in a right-left direction (the x direction shown in FIG. 4) by the light modulation unit 22, and the first dot pattern projected from the projection unit 12 of the host apparatus is spatially modulated in the right-left direction. With this, the shape of each dot of the first dot pattern becomes an oval shape or an elliptical shape elongated in the right-left direction, and the pattern extraction unit 20A can identify the first dot pattern of the host apparatus and the second dot pattern of another apparatus spatially modulated to have the dot shape in the oval shape or the elliptical shape elongated in the up-down direction.

The voice coil type vibrators 114 and 116 constituting the light modulation unit 22 shown in FIG. 4 cooperate with each other to move the projection lens 12C in the x direction and the y direction, respectively, whereby the shape of each dot of the first dot pattern can be made to an arbitrary shape. That is, it is preferable that a plurality of spatial modulation patterns (a plurality of spatial modulation patterns corresponding to the shape of each dot of the first dot pattern) for spatially modulating the first dot pattern are stored in the storage unit 24, and the light modulation unit 22 selects a spatial modulation pattern for identification from the second dot pattern projected from another apparatus from the storage unit 24, and spatially modulates the first dot pattern projected from the projection unit 12 according to the selected spatial modulation pattern.

As shown in FIGS. 8 and 9, in the overlap region B out of the distance measurement region A, in a case where the first dot pattern of the host apparatus and the second dot pattern of the another apparatus are mixed, and only the first dot pattern of the host apparatus is present in another region (another region excluding the overlap region B) of the distance measurement region A, only the first dot pattern within the overlap region B may be spatially modulated, thereby enabling identification of the first dot pattern of the host apparatus and the second dot pattern of another apparatus in the overlap region B.

In this case, the determination unit 20C functioning as a region determination unit determines the overlap region B where the distance measurement region A where the first dot pattern is projected and a projection region of the second dot pattern projected from another apparatus overlap each other. The DMD 200 constituting the light modulation unit 22 of the second embodiment shown in FIGS. 5 and 6 makes only the micromirror group corresponding to the overlap region B out of the micromirror group oscillate according to a determination result of the region determination unit. With this, identification of the first dot pattern and the second dot pattern is enabled, and since the first pattern corresponding to a non-overlap region is not spatially modulated, it is possible to image the first pattern as a dot pattern without blur.

[Distance Image Acquisition Method]

Next, a distance image acquisition method according to the invention will be described.

Figure 12:
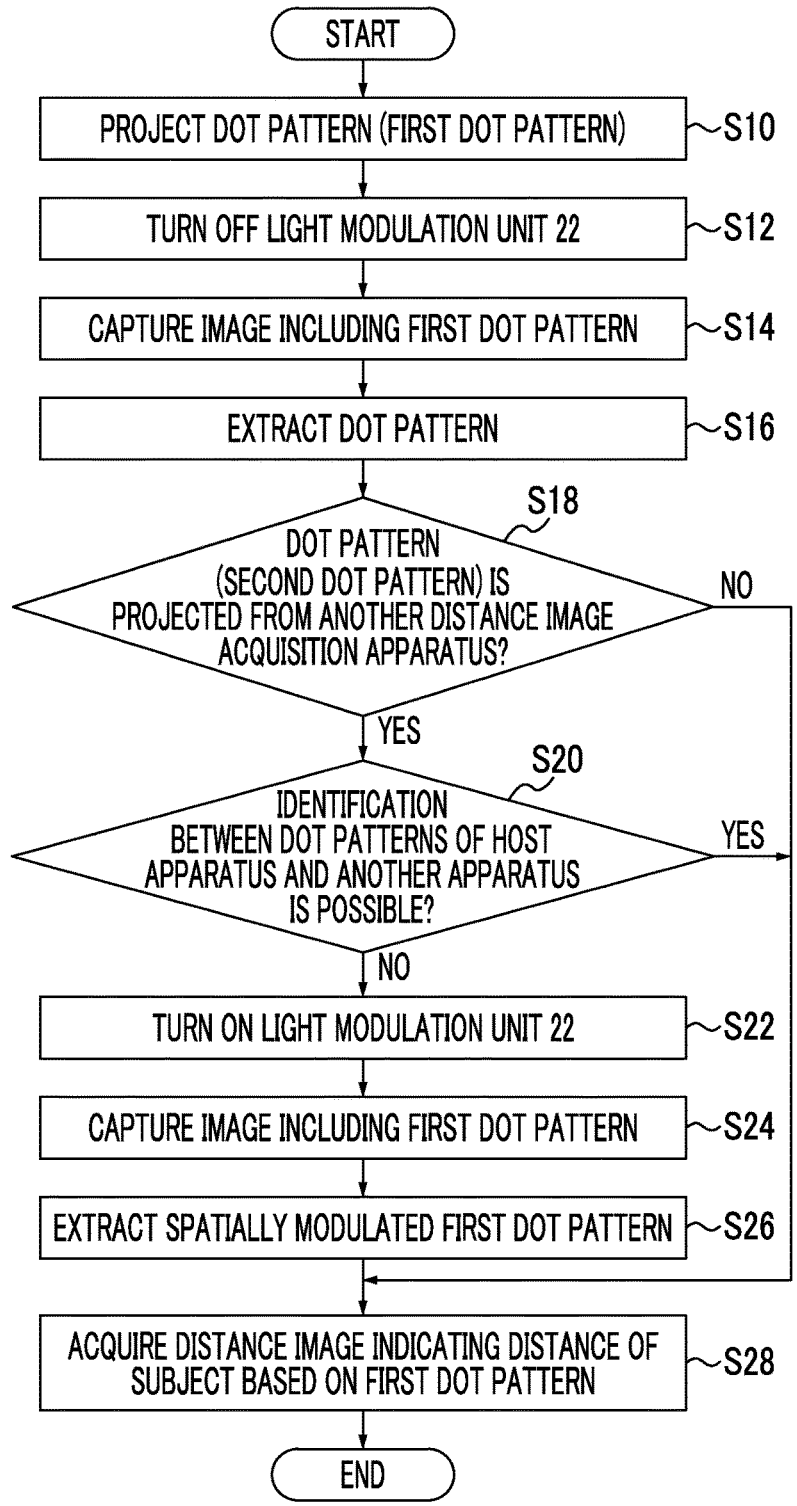
FIG. 12 is a flowchart showing a first embodiment of a distance image acquisition method according to the invention.

FIG. 12 is a flowchart showing a first embodiment of the distance image acquisition method according to the invention.

In FIG. 12, the CPU 20 turns on the near infrared LED 12A of the projection unit 12 through the drive unit 26, and makes the first dot pattern of near infrared light be projected from the projection unit 12 onto the subject within the distance measurement region (Step S10). In this case, the CPU 20 turns off the light modulation unit 22 so as not to perform the spatial modulation of the first dot pattern (Step S12).

Subsequently, an image including the non-spatially modulated first dot pattern is captured by the imaging unit 14 (Step S14). The pattern extraction unit 20A binarizes the captured image based on the threshold value and extracts a dot pattern (a binary image indicating the dot pattern) (Step S16).

Next, the determination unit 20C determines whether or not a dot pattern (second dot pattern) is projected from another distance image acquisition apparatus (Step S18). This determination can be performed according to whether or not the number of dots of the dot pattern extracted in Step S16 is greater than the number of dots of the first dot pattern, or according to whether or not the beacon information indicating the presence of the another distance image acquisition apparatus is received through the communication unit 30.

In Step S18, in a case where it is determined that the second dot pattern is projected from another distance image acquisition apparatus (in a case of "Yes"), the process transitions to Step S20, and in a case where it is determined that the second dot pattern is not projected from another distance image acquisition apparatus (in a case of "No"), the process transitions to Step S28.

In Step S20, it is determined whether or not the first dot pattern of the host apparatus and the second dot pattern of another apparatus are identifiable, and in a case where both dot patterns are idenfiable (in a case of "Yes"), the process transitions to Step S28, and in a case where both dot patterns are unidenfiable (in a case of "No"), the process transitions to Step S22.

In Step S22, the light modulation unit 22 is turned on to spatially modulate the first dot pattern. In a case where there is a spatially modulated second dot pattern among second dot patterns, the light modulation unit 22 spatially modulates the first dot pattern with a spatial modulation pattern different from that of the spatially modulated second dot pattern.

Subsequently, an image including the first dot pattern (spatially modulated first dot pattern) is captured by the imaging unit 14 (Step S24), and the pattern extraction unit 20A extracts the first dot pattern (spatially modulated first dot pattern) from the captured image (Step S26).

The distance image acquisition unit 20B acquires the distance image indicating the distance of the subject based on the dot pattern (non-spatially modulated first dot pattern) extracted in Step S16 or the spatially modulated first dot pattern extracted in Step S26 (Step S28).

In the embodiment shown in FIG. 12, although the distance image for one frame is acquired, in a case of acquiring a distance image continuous at a predetermined frame rate like video, the processing of Steps S10 to S28 is repeatedly executed until acquisition of the distance image of the video ends.

FIG. 13 is a flowchart showing a second embodiment of a distance image acquisition method according to the invention.

In FIG. 13, the CPU 20 turns off the near infrared LED 12A of the projection unit 12 (Step S100), and the imaging unit 14 performs imaging under a condition that the first dot pattern is not projected (Step S102). The determination unit 20C determines whether or not a dot pattern (second dot pattern) is projected from another distance image acquisition apparatus based on the image acquired in Step S102 (Step S104).

In a case where the second dot pattern is projected (in a case of "Yes"), a flag F indicating the presence or absence of projection is set to 1 (Step S106), and then, the process transitions to Step S110. In a case where the second dot pattern is not projected (in a case of "No"), the flag F is set to 0 (Step S108), and then, the process transitions to Step S110.

In Step S110, the CPU 20 turns on the near infrared LED 12A of the projection unit 12 through the drive unit 26, and makes the first dot pattern of near infrared light be projected from the projection unit 12 onto the subject within the distance measurement region (Step S110).

Subsequently, it is determined whether or not the flag F is 1 (Step S112), and in a case where the flag F is 1 (in a case of "Yes"), the light modulation unit 22 is turned on to spatially modulate the first dot pattern (Step S114). In a case where the flag F is not 1 (in a case of "No"), the light modulation unit 22 is turned off so as not to perform spatial modulation of the first dot pattern (Step S116). Next, an image including the first dot pattern is captured by the imaging unit 14 (Step S118). The pattern extraction unit 20A binarizes the captured image based on the threshold value and extracts the first dot pattern (a binary image indicating the first dot pattern) (Step S120). In a case where the second dot pattern is projected from another apparatus, the first dot pattern is spatially modulated, and in a case where the second dot pattern is not projected from another apparatus, while the first dot pattern is not spatially modulated, since only the first dot pattern is imaged, the pattern extraction unit 20A can extract only the first dot pattern in both cases.

The distance image acquisition unit 20B acquires the distance image indicating the distance of the subject based on the first dot pattern extracted in Step S120 (Step S122).

In the embodiment shown in FIG. 13, although the distance image for one frame is acquired, in a case of acquiring a distance image continuous at a predetermined frame rate like video, the processing of Steps S100 to S122 is repeatedly executed until acquisition of the distance image of the video ends.

In the first embodiment and the second embodiment described above, in a case where the first dot pattern projected from the host apparatus and the second dot pattern projected from another apparatus are unidentifiable or in a case where the second dot pattern is projected from another apparatus, the light modulation unit 22 is turned on to spatially modulate the first dot pattern, thereby enabling identification of the first dot pattern and the second dot pattern. Meanwhile, regardless of the presence or absence of the second dot pattern projected from another apparatus and the presence or absence of spatial modulation of the second dot pattern, the light modulation unit 22 may read the spatial modulation pattern from a plurality of spatial modulation patterns stored in the storage unit 24 in sequence or in a random manner, and may spatially modulate the first pattern projected from the projection unit 12 according to the read spatial modulation pattern.

In this case, since the first dot pattern is spatially modulated according to the spatial modulation pattern read from a plurality of spatial modulation patterns in sequence or in a random manner, the shape of each dot of the first dot pattern changes every moment. The pattern extraction unit 20A can identify a dot pattern, in which the dot shape changes, as the first dot pattern projected from the host apparatus. In a case where the shape of each dot of the first dot pattern changes every moment, there is a timing at which the first dot pattern (the first dot pattern identifiable from the second dot pattern) having the dot shape different from the dot shape of the second dot pattern of another apparatus is projected, and the pattern extraction unit 20A can extract only the first dot pattern from an image including the first dot pattern imaged at this timing.

<Another Embodiment of Image Sensor>

Figure 14A:
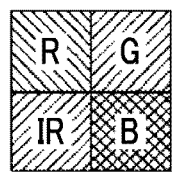
FIGS. 14A and 14B are diagrams illustrating another embodiment of an image sensor which is applicable to the distance image acquisition apparatus according to the invention.
Figure 14B:
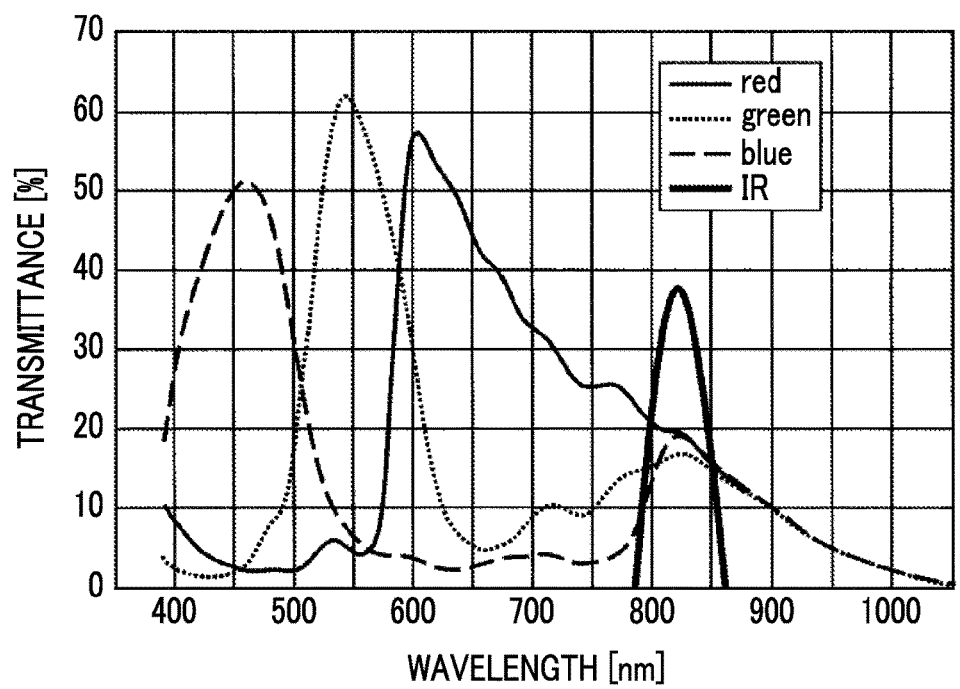

FIGS. 14A and 14B are diagrams illustrating another embodiment of an image sensor which is applicable to the distance image acquisition apparatus according to the invention. FIG. 14A is a diagram showing the basic array of 2×2 pixels of the image sensor of another embodiment. The image sensor of another embodiment is configured such that the basic array is repeatedly arranged in a horizontal direction and a vertical direction.

As shown in FIG. 14A, the basic array of 2×2 pixels has a near infrared pixel (infrared (IR) pixel) as a first light receiving element having sensitivity to the wavelength bandwidth of near infrared light and three second light receiving elements (R pixel, G pixel, and B pixel) having sensitivity to the wavelength bandwidths of visible light of red (R), green (G), and blue (B). That is, the image sensor of another embodiment is configured such that the IR pixel, the R pixel, the G pixel, and the B pixel are mixed and arranged in a two-dimensional manner.

FIG. 14B shows spectral transmittance of respective color filters of RGB provided in the R pixel, the G pixel, and the B pixel, and a spectral characteristic of near infrared light emitted from the near infrared LED 12A.

The pattern extraction unit 20A can extract the first dot pattern from near infrared image read from the IR pixel of the image sensor having the above-described configuration, and the distance image acquisition unit 20B can acquire the distance image indicating the distance of the subject based on the extracted first dot pattern.

The visible light image generation unit (not shown) in the CPU 20 can generate a visible light image (color image) of the subject within the distance measurement region from visible light images of RGB read from the R pixel, the G pixel, and the B pixel of the image sensor having the above-described configuration. While each of the filters of RGB has transmittance even to near infrared light, a structure is made in which the corresponding R pixel, G pixel, and B pixels do not have sensitivity to near infrared light, or an IR cut filter is provided to overlap each of the filters of RGB, thereby generating a visible light image having no sensitivity to near infrared light. As an alternative of the IR cut filter or the structure in which the pixels do not have sensitivity to near infrared light, a visible light cut filter may be provided instead of a near infrared filter having a bandpass characteristic in FIG. 14B, and an IR image component may be subtracted from each of images of RGB read from the R pixel, the G pixel, and the B pixel to generate a visible light image.

That is, since a near infrared image is not included in the visible light image, even if the spatially modulated first dot pattern of near infrared light is projected onto the subject, the first dot pattern does not affect the visible light image. According to the image sensor having the above-described configuration, it is possible to simultaneously acquire the distance image and the visible light image at the same angle of view based on the output of one image sensor.

An aspect to which the invention is applicable is not limited to a distance image acquisition apparatus having a single function of acquiring a distance image, and a general digital camera or a video camera which can capture a color image may have a distance image acquisition function. The invention is also applicable to mobile apparatuses which have, in addition to a distance image acquisition function, functions (a call handling function, a communication function, and other computer functions) other than the distance image acquisition function. As other aspects to which the invention is applicable, for example, mobile phones, smartphones, personal digital assistants (PDA), and portable game machines are exemplified. Hereinafter, an example of a smartphone to which the invention is applicable will be described.

<Configuration of Smartphone>

Figure 15:
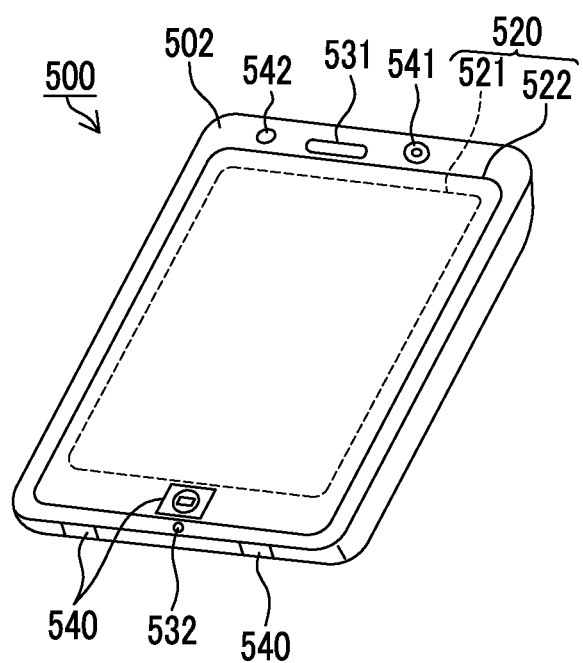
FIG. 15 is a perspective view showing the appearance of a smartphone which is an embodiment of the distance image acquisition apparatus.

FIG. 15 is a perspective view showing the appearance of a smartphone 500 which is an embodiment of a distance image acquisition apparatus.

The smartphone 500 shown in FIG. 15 has a flat plate-shaped housing 502, and comprises a display input unit 520 in which a display panel 521 as a display unit and an operation panel 522 as an input unit are integrated on one surface of the housing 502. The housing 502 comprises a speaker 531, a microphone 532, an operating unit 540, a camera unit 541, and a projection unit 542. The configuration of the housing 502 is not limited thereto, and for example, a configuration in which the display unit and the input unit are independent from each other may be employed, or a configuration having a folding structure or a slide mechanism may be employed.

Figure 16:
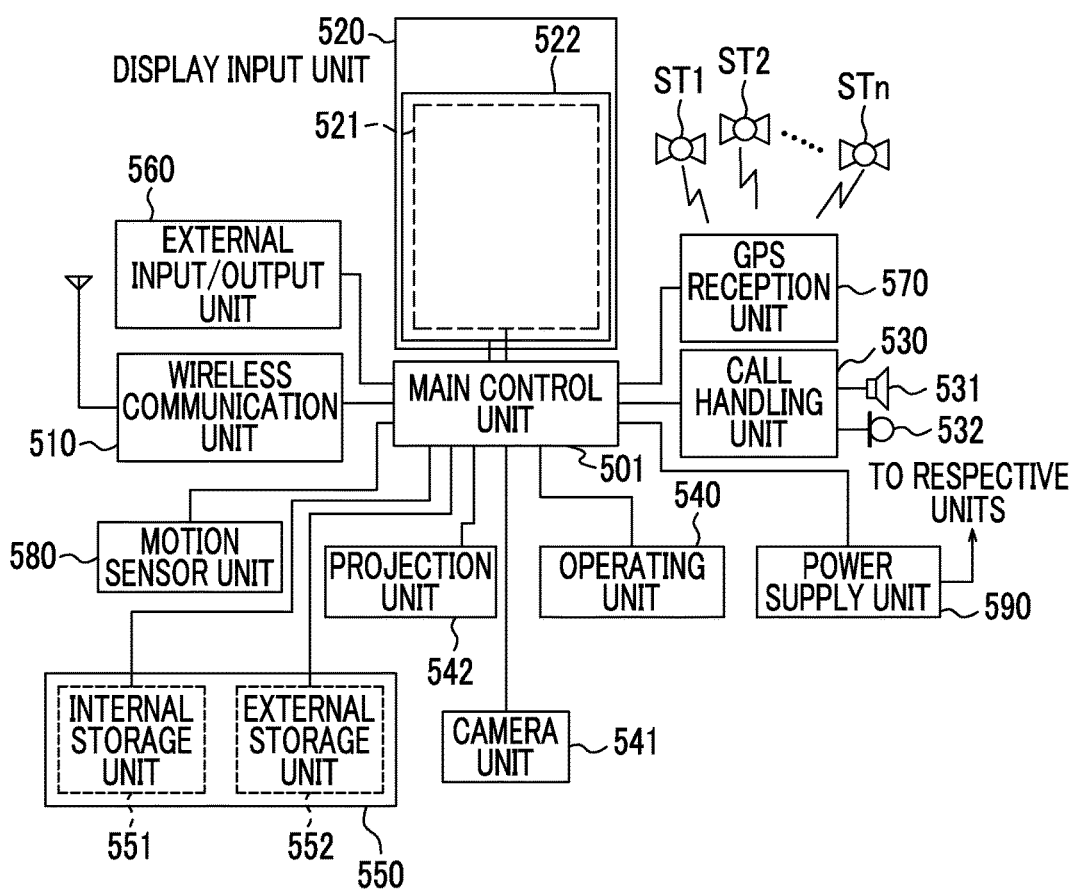
FIG. 16 is a block diagram showing the configuration of the smartphone.

FIG. 16 is a block diagram of the smartphone 500 shown in FIG. 15. As shown in FIG. 16, the smartphone 500 comprises, as principal components, a wireless communication unit 510, a display input unit 520, a call handling unit 530, an operating unit 540, a camera unit 541 functioning as an imaging unit, a storage unit 550, an external input/output unit 560, a global positioning system (GPS) reception unit 570, a motion sensor unit 580, a power supply unit 590, and a main control unit 501. The smartphone 500 has, as a principal function, a wireless communication function of performing mobile wireless communication through a base station device and a mobile communication network.

The wireless communication unit 510 performs wireless communication with the base station device in the mobile communication network according to an instruction of the main control unit 501. With the use of the wireless communication, transmission and reception of various kinds of file data, such as music data and image data, and electronic mail data, or reception of Web data, streaming data, or the like is performed.

The display input unit 520 is a so-called touch panel which displays images (static images and videos), text information, or the like to visually transfer information to the user and detects a user's operation on the displayed information under the control of the main control unit 501, and comprises the display panel 521 and the operation panel 522. In a case where a generated three-dimensional image is viewed, it is preferable that the display panel 521 is a three-dimensional display panel.

The display panel 521 uses a liquid crystal display (LCD), an organic electro-luminescence display (OELD), or the like as a display device.

The operation panel 522 is a device which is placed such that an image displayed on a display surface of the display panel 521 is visible, and detects one or a plurality of coordinates according to an operation with a user's finger or a stylus. In a case where the device is operated with the user's finger or the stylus, a detection signal generated due to the operation is output to the main control unit 501. Next, the main control unit 501 detects an operation position (coordinates) on the display panel 521 based on the received detection signal.

As shown in FIG. 15, although the display panel 521 and the operation panel 522 of the smartphone 500 are integrated to constitute the display input unit 520, the operation panel 522 is arranged so as to completely cover the display panel 521. In a case where this arrangement is employed, the operation panel 522 may have a function of detecting a user's operation even in a region outside the display panel 521. In other words, the operation panel 522 may have a detection region (hereinafter, referred to as a display region) for a superimposed portion overlapping the display panel 521 and a detection region (hereinafter, referred to as a non-display region) for an outer edge portion not overlapping the display panel 521 other than the display region.

Although the size of the display region may completely coincide with the size of the display panel 521, both of the size of the display region and the size of the display panel 521 are not necessarily made to coincide with each other. The operation panel 522 may have two sensitive regions including an outer edge portion and an inner portion other than the outer edge portion. The width of the outer edge portion is appropriately designed according to the size of the housing 502 or the like. As a position detection system which is employed in the operation panel 522, a matrix switching system, a resistive film system, a surface acoustic wave system, an infrared system, an electromagnetic induction system, an electrostatic capacitance system, and the like are exemplified, and any system may be employed.

The call handling unit 530 comprises the speaker 531 and the microphone 532, converts speech of the user input through the microphone 532 to speech data processable in the main control unit 501 and outputs speech data to the main control unit 501, or decodes speech data received by the wireless communication unit 510 or the external input/output unit 560 and outputs speech from the speaker 531. As shown in FIG. 16, for example, the speaker 531 and the microphone 532 can be mounted on the same surface as the surface on which the display input unit 520 is provided.

The operating unit 540 is a hardware key using a key switch or the like, and receives an instruction from the user. For example, the operating unit 540 is a push button type switch which is mounted on a lower surface below the display unit of the housing 502 of the smartphone 500, and is turned on in a case of being pressed with a finger or the like and is brought into an off state by restoration force of the panel or the like in a case where the finger is released.

The storage unit 550 stores a control program or control data of the main control unit 501, address data associated with the name, telephone number, and the like of a communication partner, data of transmitted and received electronic mail, Web data downloaded by Web browsing, and downloaded content data, and temporarily stores streaming data or the like. The storage unit 550 is constituted of an internal storage unit 551 embedded in the smartphone and an external storage unit 552 having a slot for a detachable external memory slot. Each of the internal storage unit 551 and the external storage unit 552 constituting the storage unit 550 is realized using a memory (for example, a Micro SD (Registered Trademark) memory, such as a flash memory type, a hard disk type, a multimedia card micro type, or a card type, or a storage medium, such as a random access memory (RAM) or a read only memory (ROM).

The external input/output unit 560 plays a role of an interface with all external devices connected to the smartphone 500, and is provided for direct or indirect connection to other external devices through communication or the like (for example, a universal serial bus or the like) or network (for example, the Internet, a wireless local area network (LAN), Bluetooth (Registered Trademark), radio frequency identification (RFID), infrared data association (IrDA), Ultra Wideband (UWB) (Registered Trademark), ZigBee (Registered Trademark), or the like).

The external devices connected to the smartphone 500 are, for example, a wired/wireless headset, a wired/wireless external charger, a wired/wireless data port, a memory card, a subscriber identity module (SIM) card, or a user identity module (UIM) card connected through a card socket, an external audio-video device connected through an audio-video input/output (I/O) terminal, an external audio-video device connected in a wireless manner, a smartphone connected in a wired or wireless manner, a personal computer connected in a wired/wireless manner, a PDA connected in a wired/wireless manner, an earphone, and the like. The external input/output unit can transfer data transmitted from the external devices to the respective components in the smartphone 500 or can transmit data in the smartphone 500 to the external devices.

The GPS reception unit 570 receives GPS signals transmitted from GPS satellites ST1 to STn according to an instruction of the main control unit 501, executes positioning calculation processing based on a plurality of received GPS signals, and detects the position of the smartphone 500 having latitude, longitude, and altitude. When position information can be acquired from the wireless communication unit 510 or the external input/output unit 560 (for example, a wireless LAN), the GPS reception unit 570 can detect the position using the position information.

The motion sensor unit 580 comprises, for example, a three-axis acceleration sensor or the like, and detects physical motion of the smartphone 500 according to an instruction of the main control unit 501. The moving direction or acceleration of the smartphone 500 is detected by detecting physical motion of the smartphone 500. The detection result is output to the main control unit 501.

The power supply unit 590 supplies electric power stored in a battery (not shown) to the respective units of the smartphone 500 according to an instruction of the main control unit 501.

The main control unit 501 is provided with a microprocessor, operates according to the control program or control data stored in the storage unit 550, and integrally controls the respective units of the smartphone 500. The main control unit 501 has a mobile communication control function of controlling respective units of a communication system in order to perform speech communication or data communication through the wireless communication unit 510, and an application processing function.

The application processing function is realized by the main control unit 501 operating according to application software stored in the storage unit 550. The application processing function is, for example, an infrared communication function of controlling the external input/output unit 560 to perform data communication with a device facing the smartphone 500, an electronic mail function of transmitting and receiving electronic mail, a Web browsing function of browsing Web pages, or the like.

The main control unit 501 has an image processing function of displaying video on the display input unit 520, or the like based on image data (static image or video data), such as received data or downloaded streaming data. The image processing function refers to a function of the main control unit 501 decoding image data, performing image processing on the decoding result, and displaying an image on the display input unit 520.

The main control unit 501 executes display control on the display panel 521 and operation detection control for detecting a user's operation through the operating unit 540 and the operation panel 522.

With the execution of the display control, the main control unit 501 displays an icon for activating application software or a software key, such as a scroll bar, or displays a window for creating electronic mail. The scroll bar refers to a software key for receiving an instruction to move a display portion of an image which is too large to fit into the display area of the display panel 521.

With the execution of the operation detection control, the main control unit 501 detects a user's operation through the operating unit 540, receives an operation on the icon or an input of text in an entry column of the window through the operation panel 522, or receives a scroll request of a display image through the scroll bar.

In addition, with the execution of the operation detection control, the main control unit 501 has a touch panel control function of determining whether or not an operation position on the operation panel 522 is the superimposed portion (display region) overlapping the display panel 521 or the outer edge portion (non-display region) not overlapping the display panel 521 other than the display region, and controlling the sensitive region of the operation panel 522 or the display position of the software key.

The main control unit 501 may detect a gesture operation on the operation panel 522 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 541 is an imaging device which performs electronic imaging using an image sensor, such as a complementary metal oxide semiconductor (CMOS) or a charge-coupled device (CCD). The above-described distance image acquisition apparatus 10 can be applied to the camera unit 541.

In this case, it is preferable that the camera unit 541 has a first light receiving element (IR pixel) transmitting near infrared light for a distance image and second light receiving elements (R pixel, G pixel, and B pixel) for color imaging mixed and arranged in a two-dimensional manner in one image sensor as shown in FIG. 14A. That is, as the image sensor of the camera unit 541, an image sensor in which an R pixel, a G pixel, and a B pixel provided with color filters of RGB and pixels (IR pixels having sensitivity only to infrared light) provided with visible light cut filter are mixed is preferably used.

The projection unit 542 has a near infrared LED, and projects a first dot pattern of near infrared light at the time of acquisition of the distance image. In a case of the smartphone 500 having an infrared communication function, the near infrared LED can be used as a light source of infrared communication.

Under the control of the main control unit 501, the camera unit 541 can convert image data of visible light obtained by imaging to compressed image data in a format of, for example, Joint Photographic coding Experts Group (JPEG) or the like and can record compressed image data in the storage unit 550 or can output compressed image data through the external input/output unit 560 or the wireless communication unit 510, and similarly, can record the distance image indicating the distance of the subject in the storage unit 550 or can output the distance image through the external input/output unit 560 or the wireless communication unit 510. In the smartphone 500 shown in FIG. 15, although the camera unit 541 is mounted on the same surface as the display input unit 520, the mounting position of the camera unit 541 is not limited thereto, and the camera unit 541 may be mounted on a rear surface of the display input unit 520, or a plurality of camera units 541 may be mounted. In a case where a plurality of camera units 541 are mounted, the camera unit 541 for imaging may be switched to perform imaging alone, or a plurality of camera units 541 may be used simultaneously to perform imaging.

The camera unit 541 can be used for various functions of the smartphone 500. For example, an image acquired by the camera unit 541 can be displayed on the display panel 521, or an image in the camera unit 541 can be used as one operation input of the operation panel 522. In a case where the GPS reception unit 570 detects the position, the position may be detected with reference to an image from the camera unit 541. In addition, the optical axis direction of the camera unit 541 of the smartphone 500 may be determined or a current use environment may be determined with reference to an image from the camera unit 541 without using the three-axis acceleration sensor or using the three-axis acceleration sensor. Of course, an image from the camera unit 541 may be used within application software.

Although the projection unit 12 of this embodiment uses the near infrared LED 12A as a light source, the invention is not limited thereto, and for example, a semiconductor laser which emits near infrared laser light, or the like may be used as a light source. For example, as a modification of the second embodiment, a near infrared laser may be used instead of the near infrared LED 12A of the light source and the collimator lens 210 and the like may be omitted, a biaxial scanning single micromirror may be used in place of the DMD 200, or a combination of two uniaxial scanning single micromirrors may be used instead of the reflection mirror 220 and the DMD 200.

EXPLANATION OF REFERENCES

10: distance image acquisition apparatus, 12, 542: projection unit, 12A: near infrared LED, 12B: diffraction optical element, 12C: projection lens, 14: imaging unit, 14A: imaging lens, 14B: image sensor, 20: central processing unit (CPU), 20A: pattern extraction unit 20B: distance image acquisition unit, 20C: determination unit, 22: light modulation unit, 24: storage unit, 28: operating unit, 30: communication unit, 500: smartphone, 541: camera unit

What is claimed is:

1. A distance image acquisition apparatus comprising:
  a projector which projects a first pattern of structured light distributed in a two-dimensional manner with respect to a subject within a distance measurement region;
  a light modulation unit which spatially modulates the first pattern projected from the projector;
  an camera which is provided in parallel with and apart from the projector by a baseline length, and captures an image including the first pattern reflected from the subject within the distance measurement region; and
  a processor configured to:
  extract the first pattern spatially modulated by the light modulation unit from the image captured by the camera;
  acquire a distance image indicating a distance of the subject within the distance measurement region based on the first pattern extracted by the processor,
  wherein the light modulation unit is a digital micromirror device which has a micromirror group, into which the first pattern projected from the projector enters, and makes the micromirror group oscillate to spatially modulate the first pattern reflected by the micromirror group, and determine an overlap region where the distance measurement region where the first pattern is projected and a projection region of a second pattern of structured light projected from another distance image acquisition apparatus overlap each other, wherein the light modulation unit makes only a micromirror corresponding to the overlap region determined by the processor out of the micromirror group of the digital micromirror device oscillate.

2. The distance image acquisition apparatus according to claim 1, further comprising:

a determination unit which determines whether or not a second pattern of structured light is projected from another distance image acquisition apparatus, wherein, in a case where the determination unit determines that the second pattern is projected from the another distance image acquisition apparatus, the light modulation unit spatially modulates the first pattern projected from the projector.

3. The distance image acquisition apparatus according to claim 2, wherein the first pattern and the second pattern are dot patterns, and the determination unit determines that the second pattern is projected from the another distance image acquisition apparatus in a case where the number of dots of a dot pattern detected from the image captured by the imaging unit exceeds the number of dots of the first pattern projected from the projector.

4. The distance image acquisition apparatus according to claim 3, wherein the light modulation unit has a storage unit which stores a plurality of spatial modulation patterns for spatially modulating the first pattern, in a case where the determination unit determines that the second pattern is projected from the another distance image acquisition apparatus, and the first pattern projected from the projector and the second pattern projected from the another distance image acquisition apparatus are unidentifiable, selects a spatial modulation pattern for identification from the second pattern projected from the another distance image acquisition apparatus from the storage unit, and spatially modulates the first pattern projected from the projector according to the selected spatial modulation pattern.

5. The distance image acquisition apparatus according to claim 2, further comprising:

a beacon information reception unit which receives beacon information transmitted from the another distance image acquisition apparatus, the beacon information indicating that the second pattern is projected from the another distance image acquisition apparatus, wherein, in a case where the beacon information reception unit receives the beacon information, the determination unit determines that the second pattern is projected from the another distance image acquisition apparatus.

6. The distance image acquisition apparatus according to claim 5, wherein the beacon information includes spatial modulation information indicating a modulation content of spatial modulation of the second pattern, and the light modulation unit has a storage unit which stores a plurality of spatial modulation patterns having different modulation contents for spatially modulating the first pattern, in a case where the determination unit determines that the second pattern is projected from the another distance image acquisition apparatus, and the first pattern projected from the projector and the second pattern projected from the another distance image acquisition apparatus are unidentifiable, selects a spatial modulation pattern for enabling identification of the first pattern and the second pattern from the storage unit, and spatially modulates the first pattern projected from the projector according to the selected spatial modulation pattern.

7. The distance image acquisition apparatus according to claim 1, wherein the light modulation unit has a storage unit which stores a plurality of spatial modulation patterns having different modulation contents for spatially modulating the first pattern, reads the spatial modulation pattern from among the plurality of spatial modulation patterns stored in the storage unit in sequence or in a random manner, and spatially modulates the first pattern projected from the projector according to the read spatial modulation pattern.

8. The distance image acquisition apparatus according to claim 1, wherein the light modulation unit is a vibrator which makes the projector or a projection optical system of the projector vibrate.

9. The distance image acquisition apparatus according to claim 8, wherein the vibrator is a piezoelectric element or a voice coil type vibrator.

10. The distance image acquisition apparatus according to claim 1, wherein light of the first pattern is near infrared light, and the camera has sensitivity to a wavelength bandwidth of at least near infrared light.

11. The distance image acquisition apparatus according to claim 1, wherein the camera has an image sensor in which a first light receiving element having sensitivity to a wavelength bandwidth of near infrared light and a second light receiving element having sensitivity to a wavelength bandwidth of visible light are mixed and arranged in a two-dimensional manner, the processor extracts the first pattern spatially modulated by the light modulation unit from an image acquired by the first light receiving element of the image sensor, and the distance image acquisition apparatus further comprises a visible light image generation unit which generates a visible light image of the subject within the distance measurement region from an image acquired by the second light receiving element of the image sensor.

* * * * *